US010880196B2

(12) United States Patent
Wolf et al.

(10) Patent No.: US 10,880,196 B2
(45) Date of Patent: Dec. 29, 2020

(54) BI-DIRECTIONAL SPEED TEST METHOD AND SYSTEM FOR CUSTOMER PREMISES EQUIPMENT (CPE) DEVICES

(71) Applicant: Charter Communications Operating, LLC, St. Louis, MO (US)

(72) Inventors: Christopher Studwell Wolf, Englewood, CO (US); Shlomo Ovadia, Denver, CO (US); Christopher G. Turner, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 129 days.

(21) Appl. No.: 15/880,338

(22) Filed: Jan. 25, 2018

(65) Prior Publication Data
US 2019/0230017 A1    Jul. 25, 2019

(51) Int. Cl.
*H04L 12/26*    (2006.01)
(52) U.S. Cl.
CPC ...... *H04L 43/0888* (2013.01); *H04L 43/0882* (2013.01); *H04L 43/0894* (2013.01); *H04L 43/10* (2013.01); *H04L 43/50* (2013.01)
(58) Field of Classification Search
None
See application file for complete search history.

(56) References Cited

U.S. PATENT DOCUMENTS

| 7,792,963 B2 | 9/2010 | Gould |
| 2003/0056217 A1 | 3/2003 | Brooks |
| 2006/0130107 A1 | 6/2006 | Gonder et al. |
| 2007/0217436 A1 | 9/2007 | Markley |
| 2009/0086639 A1* | 4/2009 | Krzanowski ............ G06F 15/16 370/241 |
| 2009/0207752 A1* | 8/2009 | Bugenhagen ........... H04L 43/50 370/252 |
| 2009/0248794 A1 | 10/2009 | Helms |
| 2010/0313236 A1 | 12/2010 | Straub |

(Continued)

OTHER PUBLICATIONS

Iperf3—iperf3 3.3 documentation, Copyright 2014-2017, Energy Sciences Network (ESnet), downloaded Dec. 11, 2017 from http://software.es.net/iperf/, pp. 1-2.

(Continued)

*Primary Examiner* — Angela Nguyen
(74) *Attorney, Agent, or Firm* — Otterstedt, Wallace & Kammer, LLP

(57) ABSTRACT

At a customer premises equipment (CPE) device in a broadband network, an invocation of a speed test by an auto-configuration server (ACS) is obtained. The invocation includes an activity detection threshold and an activity detection period. Responsive to the invocation, average interface utilization for the customer premises equipment (CPE) device is determined over the activity detection period. Responsive to the determining indicating that the average interface utilization for the customer premises equipment (CPE) device over the activity detection period does not exceed the activity detection threshold, the customer premises equipment (CPE) device cooperates with a speed test server to execute a speed test on the customer premises equipment (CPE) device using a speed test tool.

27 Claims, 37 Drawing Sheets

(56) References Cited

U.S. PATENT DOCUMENTS

| | | | | |
|---|---|---|---|---|
| 2013/0272146 | A1* | 10/2013 | Jones | H04L 43/50 370/252 |
| 2014/0149635 | A1* | 5/2014 | Bacher | G06F 9/45558 711/6 |
| 2017/0273017 | A1* | 9/2017 | Gidvani | H04W 24/10 |
| 2018/0077022 | A1* | 3/2018 | Van Oost | H04L 63/0876 |
| 2018/0159621 | A1* | 6/2018 | Beas Bujanos | H04B 10/116 |

OTHER PUBLICATIONS

Iperf3—iperf3 FAQ, Copyright 2014-2017, Energy Sciences Network (ESnet), downloaded Dec. 11, 2017 from http://software.es.net/iperf/faq.html, pp. 1-2.

IPerf—iPerf3 and iPerf2 user documentation, French iPerf Forum, downloaded Dec. 11, 2017 from https://iperf.fr/iperf-doc.php, pp. 1-16.

Energy Sciences Network (ESnet), Network Test Tools—iperf2/iperf3, downloaded Dec. 11, 2017 from https://fasterdata.es.net/performance-testing/network-troubleshooting-tools/iperf/, pp. 1-5.

Broadband Forum, Data Model Definition, TR-069 Device:2.11 Root Object definition tr-181-2-11-0.xml, downloaded Dec. 11, 2017 from https://www.broadband-forum.org/cwmp/tr-181-2-11-0.html, pp. 1-415, see especially sections "Download:1 Profile" and "Upload:1 Profile."

Broadband Forum, TR-181 Device Data Model for TR-069, Issue: 2 Amendment 2 Issue Date: Feb. 2011, pp. 1-88.

Broadband Forum Technical Report TR-181 "Device Data Model for TR-069" Issue 2 Amendment 8, Sep. 2014, pp. 1-141.

DSL Forum, TR-143 Enabling Network Throughput Performance Tests and Statistical Monitoring, Issue: 1, Issue Date: May 2008, pp. 1-47.

Hendrik Swanepoel, A super quick comparison between Kafka and Message Queues, downloaded Jan. 16, 2018 from https://hackernoon.com/a-super-quick-comparison-between-kafka-and-message-queues-e69742d855a8, pp. 1-6.

* cited by examiner

REQUEST PAYLOAD DEFINITIONS

| Field | Type | Required | Default | Description |
|---|---|---|---|---|
| mac | String | Y | N/A | MAC address of the AWG, WR, or CM it is desired to execute the speed test on. |
| operation | Array of Strings | N | N/A | Valid strings in the array are "upload" and "download". By default, both an upload and download tests will be executed. |
| duration | integer | N | 30 | Duration of test in seconds. If both up and down are specified each test will be performed for this duration. |
| transport | String | N | Best suited | Valid values are "http" or "iperf". By default, the system chooses the transport supported by the CPE device. |
| endpoint | String | N | Available server | By default, the backend will select a server with capacity to deliver the speed test to the customer. For transport IPERF, an available iPerf server will be selected, or an IP:port pair can be specified if it is known which one it is desired to use. |
| async | Boolean | N | True | By default, the API will return a GUID. |

*FIG. 10*

```
         REQUEST PAYLOAD EXAMPLE
{
"mac": "0123456789ab",
"operation": [ "download", "upload" ],
      "duration": 30
}
```

*FIG. 11*

```
              RESPONSE SAMPLE
{
"speedtest_id": "123e4567-e89b-12d3-a456-426655440000",
"status": "queued"
}
```

*FIG. 14*

SPEED TEST REQUEST

| Field | Type | Description |
|---|---|---|
| speedtest_id | String | A globally unique identifier for this speed test. Currently a GUID, but clients should treat this as an opaque string of no more than 64 bytes. |
| success | Boolean | Indicates the speed test request was successfully received and is being processed. |
| status | String | One of "queued," "complete," and "incomplete" |

*FIG. 12*

SPEED TEST COMPLETE

| Field | Type | Description |
|---|---|---|
| mac | String | MAC address of device tested. |
| operation | Array of Strings | Speed test operations that were executed. Valid values are "upload" and "download." |
| duration | Integer | Length of speed test executed (in seconds). |
| transport | String | Transport used for speed test. One of "http" and "iperf." |
| download_speed | Integer | Maximum download speed achieved in bytes per second. Will be null if a download test was not executed. |
| upload_speed | Integer | Maximum upload speed achieved in bytes per second. Will be null if an upload test was not executed. |
| speedtest_server | String | FQDN of speed test server where test was performed. |
| user | String | API username or EID of speed test API requestor. |

*FIG. 13*

```
                    RESULTS SAMPLE
{
"speedtest_id": "123e4567-e89b-12d3-a456-426655440000",
"status": "complete",
        "success": true,
        "mac": "0123456789ab",
        "operation": [ "upload", "download" ],
        "duration": 30,
        "transport": "http",
        "download_speed": 921600,
        "upload_speed": 204800,
        "speedtest_server": "speedtest_server_fqdn",
        "user" : "api_username"
}
```

*FIG. 15*

TR-181 Data Model Objects and Parameters Custom Extensions for iPerf Speed Test

| Name | Type | Write | Description | Object Default |
|---|---|---|---|---|
| Device.IP.X_CHTR_Diagnostics.DownloadDiagnostics. | object | - | Standard from [Device: 2.11] | |
| Jitter 1601 | string | - | Measurement of UDP Jitter in milliseconds, also known as packet delay variation (PDV) as described in: *ITU-T Recommendation Y.1540 RFC 5481* | |
| ActivityDetectionThreshold 1603 | unsigned Int | W | Average bitrate in Mbps (Megabits per second) of an interface over the period of time defined in ActivityDetectionPeriod. *If this value is set to 0 there is no utilization check.* | 1 |
| | | | *For Devices with an Ethernet WAN the default interface MUST be the WAN interface.* | |
| | | | *For Devices with a DOCSIS interface the default interface MUST be the southbound CMCI (Cable Modem to CPE Interface) as defined in CM-SP-CMCIv3.0-I03-170510* | |
| ActivityDetectionRetry 1605 | unsigned Int | W | *Number of times a device will retry executing the Diagnostic in the case that the ActivityDetectionThreshold is exceeed.* | 3 |
| ActivityDetectionRetryWait 1607 | unsighned dInt | W | *Number of seconds between which the device waits to retry Activity Detection.* | 20 |
| ActivityDetectionPeriod 1609 | unsigned Int | W | Number of seconds over which ActivityDetectionThreshold is calculated. | 15 |
| DownloadURL | string-(256) | W | The URL, as defined in [RFC3986], for the CPE to perform the download on. This parameter MUST be in the form of a valid HTTP [RFC2616] or FTP [RFC959] URL. | - |
| | | | The iPerf URL is formatted as: iperf://{server} -{option(s)} 1611 | |
| | | | When using FTP transport, FTP binary transfer MUST be used. | |
| | | | When using HTTP transport, persistent connections MUST be used and pipelining MUST NOT be used. | |
| | | | When using HTTP transport the HTTP Authentication MUST NOT be used. | |
| | | | iPerf MUST include server and client modes and support the reverse mode invoked by the "-R" option. 1613 | |

*FIG. 16A*

| | | | | |
|---|---|---|---|---|
| | | | Note: For time based tests (*TimeBasedTestDuration* > 0) the ACS MAY add a hint to duration of the test to the URL. See [Section 4.3/TR-143a1] for more details. | |
| DownloadTransports | string | - | Comma-separated list of strings. Supported DownloadDiagnostics transport protocols for a CPE device. Each list item is an enumeration of: | |
| | | | | |
| | | | | |
| | | | | |
| | | | *iPerf3* 1615 | |
| DiagnosticsState | string | W | Indicate the availability of diagnostic data. Enumeration of: | |
| | | | *None* (READONLY) | |
| | | | *Requested* | |
| | | | *Completed* (READONLY) | |
| | | | *Error_CannotResolveHostName* (READONLY) | |
| | | | *Error_NoRouteToHost* (READONLY) | |
| | | | *Error_InitConnectionFailed* (READONLY) | |
| | | | *Error_NoResponse* (READONLY) | |
| | | | *Error_TransferFailed* (READONLY) | |
| | | | *Error_PasswordRequestFailed* (READONLY) | |
| | | | *Error_LoginFailed* (READONLY) | |
| | | | *Error_NoTransferMode* (READONLY) | |
| | | | *Error_NoPASV* (READONLY) | |
| | | | *Error_IncorrectSize* (READONLY) | |
| | | | *Error_Timeout* (READONLY) | |
| | | | *Error_Internal* (READONLY) | |
| | | | *Error_Other* (READONLY) | 1617 |
| | | | *Error_ActivityTimeout* (READONLY) | |
| | | | If the ACS sets the value of this parameter to *Requested*, the CPE MUST initiate the corresponding diagnostic test. When writing, the only allowed value is *Requested*. To ensure the use of the proper test parameters (the writable parameters in this object), the test parameters MUST be set either prior to or at the same time as (in the same SetParameterValues) setting the *DiagnosticsState* to *Requested*. | |
| | | | When requested, the CPE SHOULD wait until after completion of the communication session with the ACS | |

*FIG. 16B*

| | | | before starting the diagnostic. | |
|---|---|---|---|---|
| | | | When the test is completed, the value of this parameter MUST be either *Completed* (if the test completed successfully), or one of the *Error* values listed above. | |
| | | | If the value of this parameter is anything other than *Completed*, the values of the results parameters for this test are indeterminate. | |
| | | | When the diagnostic initiated by the ACS is completed (successfully or not), the CPE MUST establish a new connection to the ACS to allow the ACS to view the results, indicating the Event code *8 DIAGNOSTICS COMPLETE* in the Inform message. | |
| | | | After the diagnostic is complete, the value of all result parameters (all read-only parameters in this object) MUST be retained by the CPE until either this diagnostic is run again, or the CPE reboots. After a reboot, if the CPE has not retained the result parameters from the most recent test, it MUST set the value of this parameter to *None* and remove all object instances from *PerConnectionResult* and *IncrementalResult*. | |
| | | | Modifying any of the writable parameters in this object except for this one MUST result in the value of this parameter being set to *None* and remove all object instances from *PerConnectionResult* and *IncrementalResult*. | |
| | | | While the test is in progress, modifying any of the writable parameters in this object except for this one MUST result in the test being terminated and the value of this parameter being set to *None* and remove all object instances from *PerConnectionResult* and *IncrementalResult*. | |

*FIG. 16C*

| | | | While the test is in progress, setting this parameter to *Requested* (and possibly modifying other writable parameters in this object) MUST result in the test being terminated and then restarted using the current values of the test parameters. | |
|---|---|---|---|---|
| Interface | string-(256) | W | The value MUST be the path name of a table row. The IP-layer interface over which the test is to be performed. Example: Device.IP.Interface.1<br><br>If an empty string is specified, the CPE MUST use the interface as directed by its routing policy (*Forwarding* table entries) to determine the appropriate interface. | - |
| DSCP | unsigned Int[0:63] | W | The DiffServ code point for marking packets transmitted in the test. | - |
| | | | The default value SHOULD be zero. | |
| EthernetPriority | unsigned Int[0:7] | W | Ethernet priority code for marking packets transmitted in the test (if applicable). | - |
| | | | The default value SHOULD be zero. | |
| TimeBasedTestDuration | unsigned Int-[0:999] | W | Controls time based testing [Section 4.3/TR-143a1].<br>When TimeBasedTestDuration > 0, TimeBasedTestDuration is the duration in secondsof a time based test. If TimeBasedTestDuration is 0, the test is not based on time, but on the size of the file to be downloaded. The default value SHOULD be 0. | - |
| ProtocolVersion | string | W | Indicates the IP protocol version to be used. The default value SHOULD be *Any*. Enumeration of: | - |
| | | | *Any* (Use either IPv4 or IPv6 depending on the system preference) | |
| | | | *IPv4* (Use IPv4 for the requests) | |
| | | | *IPv6* (Use IPv6 for the requests) | |
| IPAddressUsed | string-(45) | - | [IPAddress] Indicates which IP address was used to send the request. | - |
| ROMTime | dateTime | - | Request time in UTC, which MUST be specified to microsecond precision. | - |
| | | | For example: 2008-04-09T15:01:05.123456Z | |

*FIG. 16D*

| | | | | |
|---|---|---|---|---|
| | | | For HTTP this is the time at which the client sends the GET command. | |
| | | | For FTP this is the time at which the client sends the RTRV command. | |
| | | | 1619 For iPerf this is the time when the "control connection" is established. | |
| | | | If multiple connections are used, then *ROMTime* is set to the earliest *ROMTime* across all connections. | |
| BOMTime | dateTime | - | Begin of transmission time in UTC, which MUST be specified to microsecond precision | - |
| | | | For example: 2008-04-09T15:01:05.123456Z | |
| | | | For HTTP this is the time at which the first data packet is received. | |
| | | | For FTP this is the time at which the client receives the first data packet on the data connection. | |
| | | | For iPerf this is the time the first packet is sent. 1621 | |
| | | | If multiple connections are used, then *BOMTime* is set to the earliest *BOMTime* across all connections. | |
| EOMTime | dateTime | - | End of transmission in UTC, which MUST be specified to microsecond precision. | - |
| | | | For example: 2008-04-09T15:01:05.123456Z | |
| | | | For HTTP this is the time at which the last data packet is received. | |
| | | | For FTP this is the time at which the client receives the last packet on the data connection. | |
| | | | For iPerf this is the time the last packet is received. 1623 | |
| | | | If multiple connections are used, then *EOMTime* is set to the latest *EOMTime* across all connections. | |
| TestBytesReceived | unsigned Int | - | The number of *bytes* received during the FTP/HTTP transaction including FTP/HTTP headers, between *BOMTime* and *EOMTime* across all connections. | - |

*FIG. 16E*

| | | | | |
|---|---|---|---|---|
| TotalBytesReceived | unsigned Int | - | The total number of *bytes* (at the IP layer) received on the Interface between *BOMTime* and *EOMTime*. This MAY be calculated by sampling Stats.bytesReceived on the *Interface* object at *BOMTime* and at *EOMTime* and subtracting. | - |
| TotalBytesSent | unsigned Int | - | The total number of *bytes* (at the IP layer) sent on the Interface between *BOMTime* and *EOMTime*. This MAY be calculated by sampling Stats.bytesSent on the *Interface* object at *BOMTime* and at *EOMTime* and subtracting. | - |
| TestBytesReceivedUnderFullLoading | unsigned Int | - | The number of *bytes* of the test file received between the latest *PerConnectionResult.{i}.BOMTime* and the earliest *PerConnectionResult.{i}.EOMTime* across all connections. | - |
| TotalBytesReceivedUnderFullLoading | unsigned Int | - | The total number of *bytes* (at the IP layer) received in between the latest *PerConnectionResult.{i}.BOMTime* and the earliest *PerConnectionResult.{i}.EOMTime*. This MAY be calculated by sampling Stats.bytesReceived on the *Interface* object at the latest *PerConnectionResult.{i}.BOMTime* and at the earliest *PerConnectionResult.{i}.EOMTime* and subtracting. | - |
| TotalBytesSentUnderFullLoading | unsigned Int | - | The total number of *bytes* (at the IP layer) sent between the latest *PerConnectionResult.{i}.BOMTime* and the earliest *PerConnectionResult.{i}.EOMTime*. This MAY be calculated by sampling Stats.bytesSent on the *Interface* object at the latest *PerConnectionResult.{i}.BOMTime* and at the earliest *PerConnectionResult.{i}.EOMTime* and subtracting. | - |
| PeriodOfFullLoading | unsigned Int | - | The period of time in *microseconds* between the latest *PerConnectionResult.{i}.BOMTime* and the earliest *PerConnectionResult.{i}.EOMTime* of the test. | - |
| TCPOpenRequestTime | dateTime | - | Request time in UTC, which MUST be specified to microsecond precision. For example: 2008-04-09T15:01:05.123456Z | - |

*FIG. 16F*

| | | | | |
|---|---|---|---|---|
| | | | For HTTP this is the time at which the TCP socket open (SYN) was sent for the HTTP connection. | |
| | | | For FTP this is the time at which the TCP socket open (SYN) was sent for the data connection. | |
| | | | Note: Interval of 1 microsecond SHOULD be supported. | |
| | | | If multiple connections are used, then *TCPOpenRequestTime* is set to the latest *TCPOpenRequestTime* across all connections. | |
| TCPOpenResponseTime | dateTime | - | Response time in UTC, which MUST be specified to microsecond precision. | - |
| | | | For example: 2008-04-09T15:01:05.123456Z | |
| | | | For HTTP this is the time at which the TCP ACK to the socket opening the HTTP connection was received. | |
| | | | For FTP this is the time at which the TCP ACK to the socket opening the data connection was received. | |
| | | | Note: Interval of 1 microsecond SHOULD be supported. | |
| | | | If multiple connections are used, then *TCPOpenResponseTime* is set to the latest *TCPOpenResponseTime* across all connections. | |
| PerConnectionResultNumberOfEntries | unsigned Int | - | The number of entries in the PerConnectionResult table. | - |
| EnablePerConnectionResults | boolean | W | The results must be returned in the PerConnectionResult table for every connection when set to true. The default value SHOULD be false. | - |
| IncrementalResultNumberOfEntries | unsigned Int | - | The number of entries in the IncrementalResult table. | - |

*FIG. 16G*

| | | | | |
|---|---|---|---|---|
| Device.IP.Diagnostics.DownloadDiagnostics.PerConnectionResult.{i} | object | - | Results for individual connections. This table is only populated when *EnablePerConnectionResults* is *true*. A new object is created for each connection specified in *NumberOfConnections*. Instance numbers MUST start at 1 and sequentially increment as new instances are created. All instances are removed when *DiagnosticsState* is set to *Requested* or *None*. | - |
| ROMTime | dateTime | - | Request time in UTC, which MUST be specified to microsecond precision.<br><br>For example: 2008-04-09T15:01:05.123456Z<br><br>For HTTP this is the time at which the client sends the GET command.<br>For FTP this is the time at which the client sends the RTRV command. | - |
| BOMTime | dateTime | - | Begin of transmission time in UTC, which MUST be specified to microsecond precision<br><br>For example: 2008-04-09T15:01:05.123456Z<br><br>For HTTP this is the time at which the first data packet is received.<br>For FTP this is the time at which the client receives the first data packet on the data connection. | - |
| EOMTime | dateTime | - | End of transmission in UTC, which MUST be specified to microsecond precision.<br><br>For example: 2008-04-09T15:01:05.123456Z<br><br>For HTTP this is the time at which the last data packet is received.<br>For FTP this is the time at which the client receives the last packet on the data connection. | - |

*FIG. 16H*

| | | | | |
|---|---|---|---|---|
| TestBytesReceived | unsigned Int | - | The number of *bytes* of the test file received during the FTP/HTTP transaction including FTP/HTTP headers, between *BOMTime* and *EOMTime*. | - |
| TotalBytesReceived | unsigned Int | - | The total number of *bytes* (at the IP layer) received on the Interface between *BOMTime* and *EOMTime*. This MAY be calculated by sampling Stats.bytesReceived on the *Interface* object at *BOMTime* and at *EOMTime* and subtracting. | - |
| TotalBytesSent | unsigned Int | - | The total number of *bytes* (at the IP layer) sent on the Interface between *BOMTime* and *EOMTime*. This MAY be calculated by sampling Stats.bytesSent on the *Interface* object at *BOMTime* and at *EOMTime* and subtracting. | - |
| TCPOpenRequestTime | dateTime | - | Request time in UTC, which MUST be specified to microsecond precision.<br><br>For example: 2008-04-09T15:01:05.123456Z<br><br>For HTTP this is the time at which the TCP socket open (SYN) was sent for the HTTP connection.<br>For FTP this is the time at which the TCP socket open (SYN) was sent for the data connection. | - |
| TCPOpenResponseTime | dateTime | - | Response time in UTC, which MUST be specified to microsecond precision.<br><br>For example: 2008-04-09T15:01:05.123456Z<br><br>For HTTP this is the time at which the TCP ACK to the socket opening the HTTP connection was received.<br>For FTP this is the time at which the TCP ACK to the socket opening the data connection was received. | - |

*FIG. 16I*

| | | | | |
|---|---|---|---|---|
| Device.IP.Diagnostics.DownloadDiagnostics.IncrementalResult.{i}. | object | - | Results for time segmented tests (tests where *TimeBasedTestDuration* > 0 and *TimeBasedTestMeasurementInterval* > 0). This data is totaled across all connections in the test. A new object is created every *TimeBasedTestMeasurementInterval* after that interval has completed. Instance numbers MUST start at 1 and sequentially increment as new instances are created. All instances are removed when *DiagnosticsState* is set to *Requested* or *None*. | - |
| TestBytesReceived | unsigned Int | - | Change in the value of *TestBytesReceivedUnderFullLoading* between *StartTime* and *EndTime*. | - |
| TotalBytesReceived | unsigned Int | - | The total number of *bytes* (at the IP layer) received on the Interface between *StartTime* and *EndTime*. This MAY be calculated by sampling Stats.bytesReceived on the *Interface* object at *StartTime* and at *EndTime* and subtracting. | - |
| TotalBytesSent | unsigned Int | - | The total number of *bytes* (at the IP layer) sent on the Interface between *StartTime* and *EndTime*. This MAY be calculated by sampling Stats.bytesSent on the *Interface* object at *StartTime* and at *EndTime* and subtracting. | - |
| StartTime | dateTime | - | The start time of this interval which MUST be specified to microsecond precision.<br><br>For example: 2008-04-09T15:01:05.123456Z | - |
| EndTime | dateTime | - | The end time of this interval which MUST be specified to microsecond precision.<br><br>For example: 2008-04-09T15:01:05.123456Z | - |
| Device.IP.X_CHTR_Diagnostics.UploadDiagnostics. | object | - | Standard from [Device: 2.11] | |
| Jitter 1625 | string | - | Measurement of UDP Jitter in milliseconds , also known as packet delay variation (PDV) as described in: *ITU-T Recommendation Y.1540 RFC 5481* | |
| ActivityDetectionThreshold 1627 | unsigned Int | W | Average bitrate in Mbps (Megabits per second) of an interface over the period of time defined in ActivityDetectionPeriod. | 1 |

*FIG. 16J*

| | | | For Devices with an Ethernet WAN the default interface MUST be the WAN interface. | |
|---|---|---|---|---|
| | | | For Devices with a DOCSIS interface the default interface MUST be the southbound CMCI (Cable Modem to CPE Interface) as defined in CM-SP-CMCIv3.0-I03-170510 | |
| ActivityDetectionRetry 1629 | unsigned Int | W | Number of times a device will retry executing the Diagnostic in the case that the ActivityDetectionThreshold is exceeed. | 3 |
| ActivityDetectionRetryWait 1631 | unsighne dInt | W | Number of seconds between which the device waits to retry Activity Detection. | 20 |
| ActivityDetectionPeriod 1633 | unsigned Int | W | Number of seconds over which ActivityDetectionThreshold is calculated. | 15 |
| UploadURL | string-(256) | W | The URL, as defined in [RFC3986], for the CPE to perform the download on. This parameter MUST be in the form of a valid HTTP [RFC2616] or FTP [RFC959] URL. | - |
| | | | The iPerf URL is formatted as: iperf://{server} -{option(s)} 1635 | |
| | | | When using FTP transport, FTP binary transfer MUST be used. | |
| | | | When using HTTP transport, persistent connections MUST be used and pipelining MUST NOT be used. | |
| | | | When using HTTP transport the HTTP Authentication MUST NOT be used. | |
| | | | iPerf MUST include server and client modes and support the reverse mode invoked by the "-R" option. 1637 | |
| | | | Note: For time based tests (TimeBasedTestDuration > 0) the ACS MAY add a hint to duration of the test to the URL. See [Section 4.3/TR-143a1] for more details. | |
| UploadTransports | string | - | Comma-separated list of strings. Supported UploadDiagnostics transport protocols for a CPE device. Each list item is an enumeration of: | |
| | | | HTTP | |
| | | | FTP (OPTIONAL) | |
| | | | iPerf2 1639 | |
| | | | iPerf3 1641 | |
| DiagnosticsState | string | W | Indicate the availability of diagnostic data. Enumeration of: | - |
| | | | None (READONLY) | |
| | | | Requested | |

*FIG. 16K*

| | | | |
|---|---|---|---|
| | | Completed (READONLY) | |
| | | Error_CannotResolveHostName (READONLY) | |
| | | Error_NoRouteToHost (READONLY) | |
| | | Error_InitConnectionFailed (READONLY) | |
| | | Error_NoResponse (READONLY) | |
| | | Error_TransferFailed (READONLY) | |
| | | Error_PasswordRequestFailed (READONLY) | |
| | | Error_LoginFailed (READONLY) | |
| | | Error_NoTransferMode (READONLY) | |
| | | Error_NoPASV (READONLY) | |
| | | Error_IncorrectSize (READONLY) | |
| | | Error_Timeout (READONLY) | |
| | | Error_Internal (READONLY) | |
| | | Error_Other (READONLY) | |
| | | Error_ActivityTimeout (READONLY) | 1643 |
| | | If the ACS sets the value of this parameter to *Requested*, the CPE MUST initiate the corresponding diagnostic test. When writing, the only allowed value is *Requested*. To ensure the use of the proper test parameters (the writable parameters in this object), the test parameters MUST be set either prior to or at the same time as (in the same SetParameterValues) setting the *DiagnosticsState* to *Requested*. | |
| | | When requested, the CPE SHOULD wait until after completion of the communication session with the ACS before starting the diagnostic. | |
| | | When the test is completed, the value of this parameter MUST be either *Completed* (if the test completed successfully), or one of the *Error* values listed above. | |
| | | If the value of this parameter is anything other than *Completed*, the values of the results parameters for this test are indeterminate. | |
| | | When the diagnostic initiated by the ACS is completed (successfully or not), the CPE MUST establish a new connection to the ACS to allow the ACS to view the results, indicating the Event code *8 DIAGNOSTICS* | |

*FIG. 16L*

| | | | | |
|---|---|---|---|---|
| | | | COMPLETE in the Inform message. | |
| | | | After the diagnostic is complete, the value of all result parameters (all read-only parameters in this object) MUST be retained by the CPE until either this diagnostic is run again, or the CPE reboots. After a reboot, if the CPE has not retained the result parameters from the most recent test, it MUST set the value of this parameter to *None* and remove all object instances from *PerConnectionResult* and *IncrementalResult*. | |
| | | | Modifying any of the writable parameters in this object except for this one MUST result in the value of this parameter being set to *None* and remove all object instances from *PerConnectionResult* and *IncrementalResult*. | |
| | | | While the test is in progress, modifying any of the writable parameters in this object except for this one MUST result in the test being terminated and the value of this parameter being set to *None* and remove all object instances from *PerConnectionResult* and *IncrementalResult*. | |
| | | | While the test is in progress, setting this parameter to *Requested* (and possibly modifying other writable parameters in this object) MUST result in the test being terminated and then restarted using the current values of the test parameters. | |
| Interface | string-(256) | W | The value MUST be the path name of a table row. The IP-layer interface over which the test is to be performed. Example: Device.IP.Interface.1 | - |
| | | | If an empty string is specified, the CPE MUST use the interface as directed by its routing policy (*Forwarding* table entries) to determine the appropriate interface. | |

*FIG. 16M*

| | | | | |
|---|---|---|---|---|
| DSCP | unsigned Int[0:63] | W | The DiffServ code point for marking packets transmitted in the test. | - |
| | | | The default value SHOULD be zero. | |
| EthernetPriority | unsigned Int[0:7] | W | Ethernet priority code for marking packets transmitted in the test (if applicable). | - |
| | | | The default value SHOULD be zero. | |
| TestFileLength | unsigned Int | W | The size of the file (in bytes) to be uploaded to the server.<br><br>The CPE MUST insure the appropriate number of bytes are sent. | |
| TimeBasedTestDuration | unsigned Int-[0:999] | W | Controls time based testing [Section 4.3/TR-143a1]. When $TimeBasedTestDuration > 0$, TimeBasedTestDuration is the duration in seconds of a time based test. If TimeBasedTestDuration is 0, the test is not based on time, but on the size of the file to be downloaded. The default value SHOULD be 0. | - |
| TimeBasedTestMeasurementInterval | unsigned Int-[0:999] | W | The measurement interval duration in *seconds* for objects in *IncrementalResult* for a time based FTP/HTTP download test (when $TimeBasedTestDuration > 0$). The default value SHOULD be 0, which implies *IncrementalResult* collection is disabled. | - |
| | | | For example if *TimeBasedTestDuration* is 90 seconds and *TimeBasedTestMeasurementInterval* is 10 *seconds*, there will be 9 results in *IncrementalResult*, each with a 10 *seconds* duration. | |
| TimeBasedTestMeasurementOffset | unsigned Int-[0:255] | W | This *TimeBasedTestMeasurementOffset* works in conjunction with *TimeBasedTestMeasurementInterval* to allow the interval measurement to start a number of *seconds* after *BOMTime*. The test measurement interval in *IncrementalResult* starts at time *BOMTime* + *TimeBasedTestMeasurementOffset* to allow for slow start window removal of file transfers. | - |

*FIG. 16N*

| | | | | |
|---|---|---|---|---|
| | | | This *TimeBasedTestMeasurementOffset* is in *seconds*. The default value SHOULD be 0. | |
| ProtocolVersion | string | W | Indicates the IP protocol version to be used. The default value SHOULD be *Any*. Enumeration of: | - |
| | | | *Any* (Use either IPv4 or IPv6 depending on the system preference) | |
| | | | *IPv4* (Use IPv4 for the requests) | |
| | | | *IPv6* (Use IPv6 for the requests) | |
| NumberOfConnections | unsigned Int[1:] | W | The number of connections to be used in the test. The default value SHOULD be 1. NumberOfConnections MUST NOT be set to a value greater than DownloadDiagnosticMaxConnections. | - |
| IPAddressUsed | string-(45) | - | [IPAddress] Indicates which IP address was used to send the request. | |
| ROMTime | dateTime | - | Request time in UTC, which MUST be specified to microsecond precision. | - |
| | | | For example: 2008-04-09T15:01:05.123456Z | |
| | | | For HTTP this is the time at which the client sends the GET command. | |
| | | | For FTP this is the time at which the client sends the RTRV command. | |
| | | | 1645 For iPerf this is the time when the "control connection" is established. | |
| | | | If multiple connections are used, then *ROMTime* is set to the earliest *ROMTime* across all connections. | |
| BOMTime | dateTime | - | Begin of transmission time in UTC, which MUST be specified to microsecond precision | - |
| | | | For example: 2008-04-09T15:01:05.123456Z | |
| | | | For HTTP this is the time at which the first data packet is received. | |
| | | | For FTP this is the time at which the client receives the first data packet on the data connection. | |
| | | | 1647 For iPerf this is the time the first packet is sent. | |
| | | | If multiple connections are used, then *BOMTime* is set to the earliest *BOMTime* across all connections. | |

*FIG. 16O*

| | | | | |
|---|---|---|---|---|
| EOMTime | dateTime | - | End of transmission in UTC, which MUST be specified to microsecond precision. | - |
| | | | For example: 2008-04-09T15:01:05.123456Z | |
| | | | For HTTP this is the time at which the last data packet is received. | |
| | | | For FTP this is the time at which the client receives the last packet on the data connection. | |
| | | | 1649 For iPerf this is the time the last packet is received. | |
| | | | If multiple connections are used, then *EOMTime* is set to the latest *EOMTime* across all connections. | |
| TestBytesSent | unsigned Int | - | The number of bytes of the test file sent during the FTP/HTTP transaction including FTP/HTTP headers, between BOMTime and EOMTime acrosss all connections. | - |
| TotalBytesReceived | unsigned Int | - | The total number of *bytes* (at the IP layer) received on the Interface between *BOMTime* and *EOMTime*. This MAY be calculated by sampling Stats.bytesReceived on the *Interface* object at *BOMTime* and at *EOMTime* and subtracting. | - |
| TotalBytesSent | unsigned Int | - | The total number of *bytes* (at the IP layer) sent on the Interface between *BOMTime* and *EOMTime*. This MAY be calculated by sampling Stats.bytesSent on the *Interface* object at *BOMTime* and at *EOMTime* and subtracting. | - |
| TestBytesReceivedUnderFullLoading | unsigned Int | - | The number of *bytes* of the test file received between the latest *PerConnectionResult.{i}.BOMTime* and the earliest *PerConnectionResult.{i}.EOMTime* across all connections. | - |
| TotalBytesReceivedUnderFullLoading | unsigned Int | - | The total number of *bytes* (at the IP layer) received in between the latest *PerConnectionResult.{i}.BOMTime* and the earliest *PerConnectionResult.{i}.EOMTime*. This MAY be calculated by sampling Stats.bytesReceived on the *Interface* object at the latest *PerConnectionResult.{i}.BOMTime* and at the earliest *PerConnectionResult.{i}.EOMTime* and subtracting. | - |

*FIG. 16P*

| | | | | |
|---|---|---|---|---|
| TotalBytesSentUnderFullLoading | unsigned Int | - | The total number of *bytes* (at the IP layer) sent between the latest *PerConnectionResult.{i}.BOMTime* and the earliest *PerConnectionResult.{i}.EOMTime*. This MAY be calculated by sampling Stats.bytesSent on the *Interface* object at the latest *PerConnectionResult.{i}.BOMTime* and at the earliest *PerConnectionResult.{i}.EOMTime* and subtracting. | - |
| PeriodOfFullLoading | unsigned Int | - | The period of time in *microseconds* between the latest *PerConnectionResult.{i}.BOMTime* and the earliest *PerConnectionResult.{i}.EOMTime* of the test. | - |
| TCPOpenRequestTime | dateTime | - | Request time in UTC, which MUST be specified to microsecond precision. For example: 2008-04-09T15:01:05.123456Z For HTTP this is the time at which the TCP socket open (SYN) was sent for the HTTP connection. For FTP this is the time at which the TCP socket open (SYN) was sent for the data connection. Note: Interval of 1 microsecond SHOULD be supported. If multiple connections are used, then *TCPOpenRequestTime* is set to the latest *TCPOpenRequestTime* across all connections. | - |
| TCPOpenResponseTime | dateTime | - | Response time in UTC, which MUST be specified to microsecond precision. For example: 2008-04-09T15:01:05.123456Z For HTTP this is the time at which the TCP ACK to the socket opening the HTTP connection was received. For FTP this is the time at which the TCP ACK to the socket opening the data connection was received. Note: Interval of 1 microsecond SHOULD be supported. | - |

*FIG. 16Q*

| | | | | |
|---|---|---|---|---|
| | | | If multiple connections are used, then *TCPOpenResponseTime* is set to the latest *TCPOpenResponseTime* across all connections. | |
| PerConnectionResultNumberOfEntries | unsigned Int | - | The number of entries in the PerConnectionResult table. | - |
| EnablePerConnectionResults | boolean | W | The results must be returned in the PerConnectionResult table for every connection when set to true. The default value SHOULD be false. | - |
| IncrementalResultNumberOfEntries | unsigned Int | - | The number of entries in the IncrementalResult table. | - |
| | | | | |
| Device.IP.Diagnostics.UploadDiagnostics. PerConnectionResult.{i}. | object | - | Results for individual connections. This table is only populated when *EnablePerConnectionResults* is *true*. A new object is created for each connection specified in *NumberOfConnections*. Instance numbers MUST start at 1 and sequentially increment as new instances are created. All instances are removed when *DiagnosticsState* is set to *Requested* or *None*. | - |
| ROMTime | dateTime | - | Request time in UTC, which MUST be specified to microsecond precision. | - |
| | | | For example: 2008-04-09T15:01:05.123456Z | |
| | | | For HTTP this is the time at which the client sends the GET command. | |
| | | | For FTP this is the time at which the client sends the RTRV command. | |
| BOMTime | dateTime | - | Begin of transmission time in UTC, which MUST be specified to microsecond precision | - |
| | | | For example: 2008-04-09T15:01:05.123456Z | |
| | | | For HTTP this is the time at which the first data packet is received. | |
| | | | For FTP this is the time at which the client receives the first data packet on the data connection. | |
| EOMTime | dateTime | - | End of transmission in UTC, which MUST be specified to microsecond | - |

*FIG. 16R*

| | | | precision. | |
| --- | --- | --- | --- | --- |
| | | | For example: 2008-04-09T15:01:05.123456Z | |
| | | | For HTTP this is the time at which the last data packet is received. | |
| | | | For FTP this is the time at which the client receives the last packet on the data connection. | |
| TestBytesSent | unsigned Int | - | The number of *bytes* of the test file sent during the FTP/HTTP transaction including FTP/HTTP headers, between *BOMTime* and *EOMTime*. | - |
| TotalBytesReceived | unsigned Int | - | The total number of *bytes* (at the IP layer) received on the Interface between *BOMTime* and *EOMTime*. This MAY be calculated by sampling Stats.bytesReceived on the *Interface* object at *BOMTime* and at *EOMTime* and subtracting. | - |
| TotalBytesSent | unsigned Int | - | The total number of *bytes* (at the IP layer) sent on the Interface between *BOMTime* and *EOMTime*. This MAY be calculated by sampling Stats.bytesSent on the *Interface* object at *BOMTime* and at *EOMTime* and subtracting. | - |
| TCPOpenRequestTime | dateTime | - | Request time in UTC, which MUST be specified to microsecond precision. | - |
| | | | For example: 2008-04-09T15:01:05.123456Z | |
| | | | For HTTP this is the time at which the TCP socket open (SYN) was sent for the HTTP connection. | |
| | | | For FTP this is the time at which the TCP socket open (SYN) was sent for the data connection. | |
| TCPOpenResponseTime | dateTime | - | Response time in UTC, which MUST be specified to microsecond precision. | - |
| | | | For example: 2008-04-09T15:01:05.123456Z | |
| | | | For HTTP this is the time at which the TCP ACK to the socket opening the HTTP connection was received. | |

*FIG. 16S*

| | | | | |
|---|---|---|---|---|
| | | | For FTP this is the time at which the TCP ACK to the socket opening the data connection was received. | |
| Device.IP.Diagnostics.UploadDiagnostics.IncrementalResult.{i}. | object | - | Results for time segmented tests (tests where *TimeBasedTestDuration* > 0 and *TimeBasedTestMeasurementInterval* > 0). This data is totaled across all connections in the test. A new object is created every *TimeBasedTestMeasurementInterval* after that interval has completed. Instance numbers MUST start at 1 and sequentially increment as new instances are created. All instances are removed when *DiagnosticsState* is set to *Requested* or *None*. | - |
| TestBytesSent | unsigned int | - | Change in the value of *TestBytesSent* between *StartTime* and *EndTime*. | - |
| TotalBytesReceived | unsigned int | - | The total number of *bytes* (at the IP layer) received on the Interface between *StartTime* and *EndTime*. This MAY be calculated by sampling Stats.bytesReceived on the *Interface* object at *StartTime* and at *EndTime* and subtracting. | - |
| TotalBytesSent | unsigned int | - | The total number of *bytes* (at the IP layer) sent on the Interface between *StartTime* and *EndTime*. This MAY be calculated by sampling Stats.bytesSent on the *Interface* object at *StartTime* and at *EndTime* and subtracting. | |
| StartTime | dateTime | - | The start time of this interval which MUST be specified to microsecond precision. | - |
| | | | For example: 2008-04-09T15:01:05.123456Z | |
| EndTime | dateTime | - | The end time of this interval which MUST be specified to microsecond precision. | |
| | | | For example: 2008-04-09T15:01:05.123456Z | |
| | | | | |

*FIG. 16T*

BI-DIRECTIONAL SPEED TEST METHOD AND SYSTEM FOR CUSTOMER PREMISES EQUIPMENT (CPE) DEVICES

FIELD OF THE INVENTION

The present invention relates generally to the electrical, electronic, and computer arts, and more particularly relates to speed testing in broadband networks and the like.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Network speed is a pertinent parameter in various types of wired and wireless networks.

Speed tests performed by customer premises equipment (CPE) devices using HTTP (hypertext transfer protocol) typically measure the download and upload rates between the CPE device and the Internet Service Provider (ISP) speed test server. The network throughput test results are currently being sent via techniques known from DSL Forum Technical Report TR-143, "Enabling Network Throughput Performance Tests and Statistical Monitoring," Issue 1, May 2008, expressly incorporated by reference herein in its entirety for all purposes. Such speed tests are typically done for data rates below 400 Mbps. For multi-Gbps data rates, multiple simultaneous TCP (transfer control protocol) connections are typically needed, which is undesirable for many reasons such as increasing measurement overhead and network latency.

One current application used to measure network bandwidth is called "iPerf"; a useful tool for active measurements of the maximum achievable bandwidth on IP (Internet Protocol) networks. Versions include iPerf2 and iPerf3. The iPerf tool can be used to test either TCP (transmission control protocol) or UDP (user datagram protocol) network throughput. However, the iPerf application lacks the remote execution and collection of results that are needed by the ISP for mass deployment of CPE devices.

For the sake of clarity, it should be noted that "bandwidth" refers to how fast a client device can send data over a single communication channel, while "throughput" refers to how fast a client device is actually sending data over the communication channel.

SUMMARY OF THE INVENTION

Techniques are provided for a bi-directional speed test method and system for customer premises equipment (CPE) devices.

In one aspect, an exemplary method includes obtaining, at a customer premises equipment (CPE) device in a broadband network, an invocation of a speed test by an auto-configuration server (ACS). The invocation includes an activity detection threshold and an activity detection period. A further step includes, responsive to the invocation, determining average interface utilization for the customer premises equipment (CPE) device over the activity detection period. An even further step includes, responsive to the determining indicating that the average interface utilization for the customer premises equipment (CPE) device over the activity detection period does not exceed the activity detection threshold, the customer premises equipment (CPE) device cooperating with a speed test server to execute a speed test on the customer premises equipment (CPE) device using a speed test tool.

In another aspect, an exemplary customer premises equipment (CPE) device includes a memory; at least one processor coupled to the memory; at least one wide area network (WAN) port; and a non-transitory persistent storage medium that contains instructions which, when loaded into the memory, configure the at least one processor to obtain an invocation of a speed test by an auto-configuration server (ACS). The invocation includes an activity detection threshold and an activity detection period. The instructions further configure the at least one processor to, in response to the invocation, determine average interface utilization for the customer premises equipment (CPE) device over the activity detection period; and, in response to the determining indicating that the average interface utilization for the customer premises equipment (CPE) device over the activity detection period does not exceed the activity detection threshold, cooperate with a speed test server to execute a speed test on the customer premises equipment (CPE) device using a speed test tool, via the wide area network (WAN) port.

In still another aspect, an exemplary system includes a customer premises equipment (CPE) device; and a speed test server coupled to the customer premises equipment (CPE) device. The customer premises equipment (CPE) device is configured to obtain an invocation of a speed test. The invocation includes an activity detection threshold and an activity detection period. The customer premises equipment (CPE) device is further configured to, in response to the invocation, determine average interface utilization for the customer premises equipment (CPE) device over the activity detection period; and, in response to the determining indicating that the average interface utilization for the customer premises equipment (CPE) device over the activity detection period does not exceed the activity detection threshold, execute a speed test on the customer premises equipment (CPE) device, in conjunction with the speed test server, using a speed test tool.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., server(s), set-top box or other CPE) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide the ability to carry out speed tests for mass CPE deployments for data rates well beyond 400 Mbps, without the need for multiple simultaneous TCP (transfer control protocol) connections. Furthermore, one or more embodiments provide increased reliability of speed test results, particularly if the speed test server and client device are located in different geographic areas. Yet further, one or more embodiments can advantageously be implemented using "iPerf" open-source software that can be run on many different type of platforms such as Linux, UNIX, and Windows.

These and other features and advantages of the present invention will become apparent from the following detailed description of illustrative embodiments thereof, which is to be read in connection with the accompanying drawings.

BRIEF DESCRIPTION OF THE DRAWINGS

FIG. 10 shows request payload definitions for a speed test request application programming interface (API), according to an aspect of the invention;

FIG. 11 shows a request payload example for a speed test request application programming interface (API), according to an aspect of the invention;

FIG. 12 shows speed test request definitions for a speed test request application programming interface (API), according to an aspect of the invention;

FIG. 13 shows speed test complete definitions for a speed test request application programming interface (API), according to an aspect of the invention;

FIG. 14 shows a response sample for a speed test request application programming interface (API), according to an aspect of the invention;

FIG. 15 shows a results sample for a speed test request application programming interface (API), according to an aspect of the invention;

FIGS. 16A-16T (collectively, FIG. 16) show TR-181 data model objects and parameters custom extensions for an iPerf speed test, according to an aspect of the invention;

DETAILED DESCRIPTION OF PREFERRED EMBODIMENTS

Figure 1:
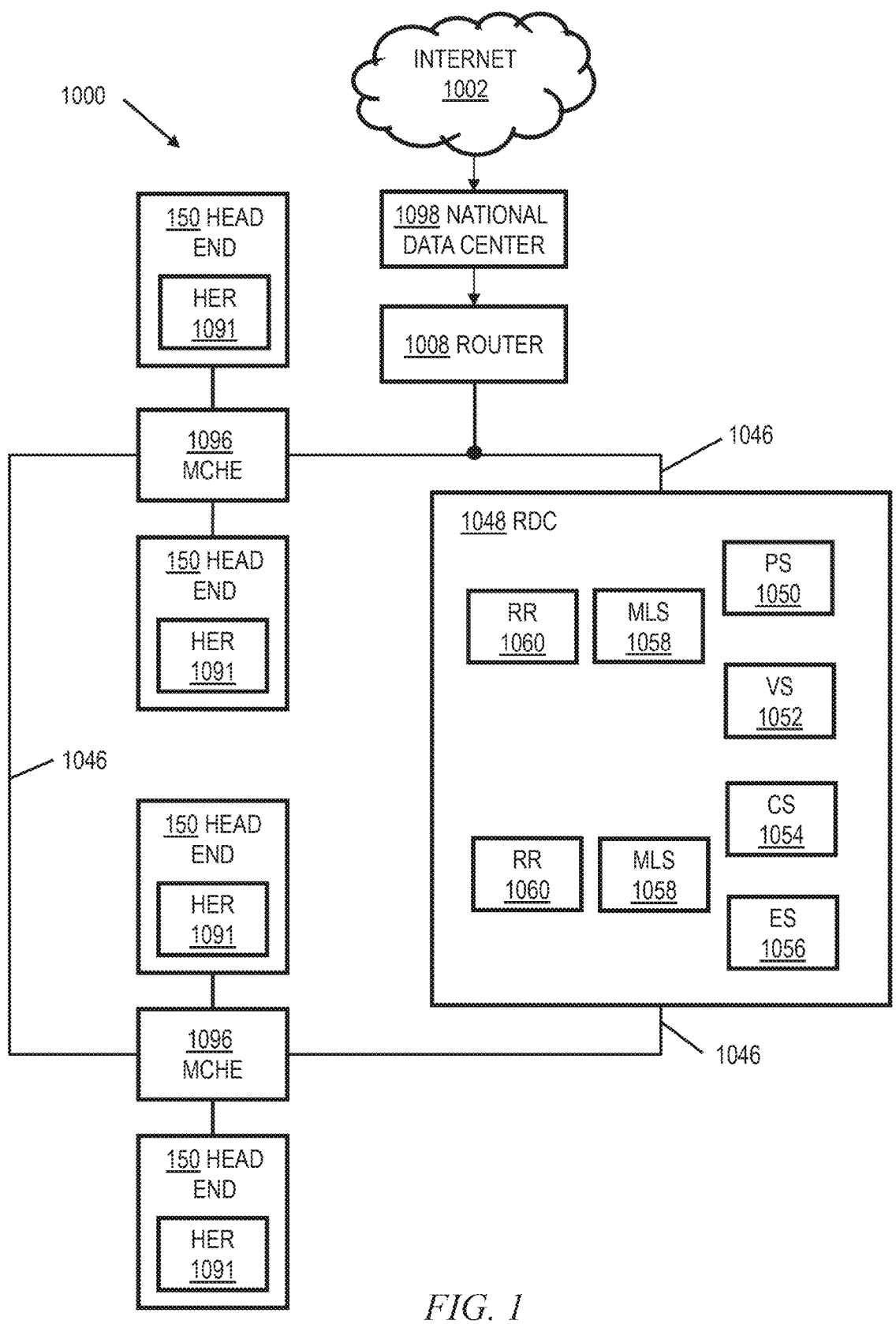
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/ Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
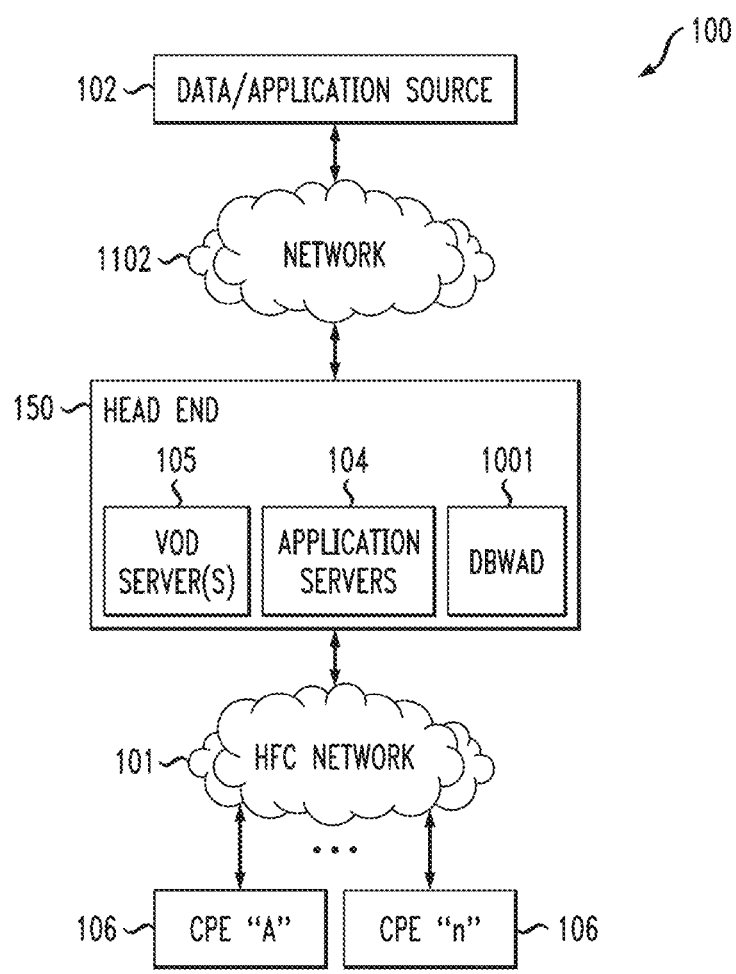
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/ 0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 18 and 19.

Also included (for example, in head end 150) is a dynamic bandwidth allocation device (DBWAD) 1001 such as a global session resource manager, which is itself a non-limiting example of a session resource manager.

Figure 3:
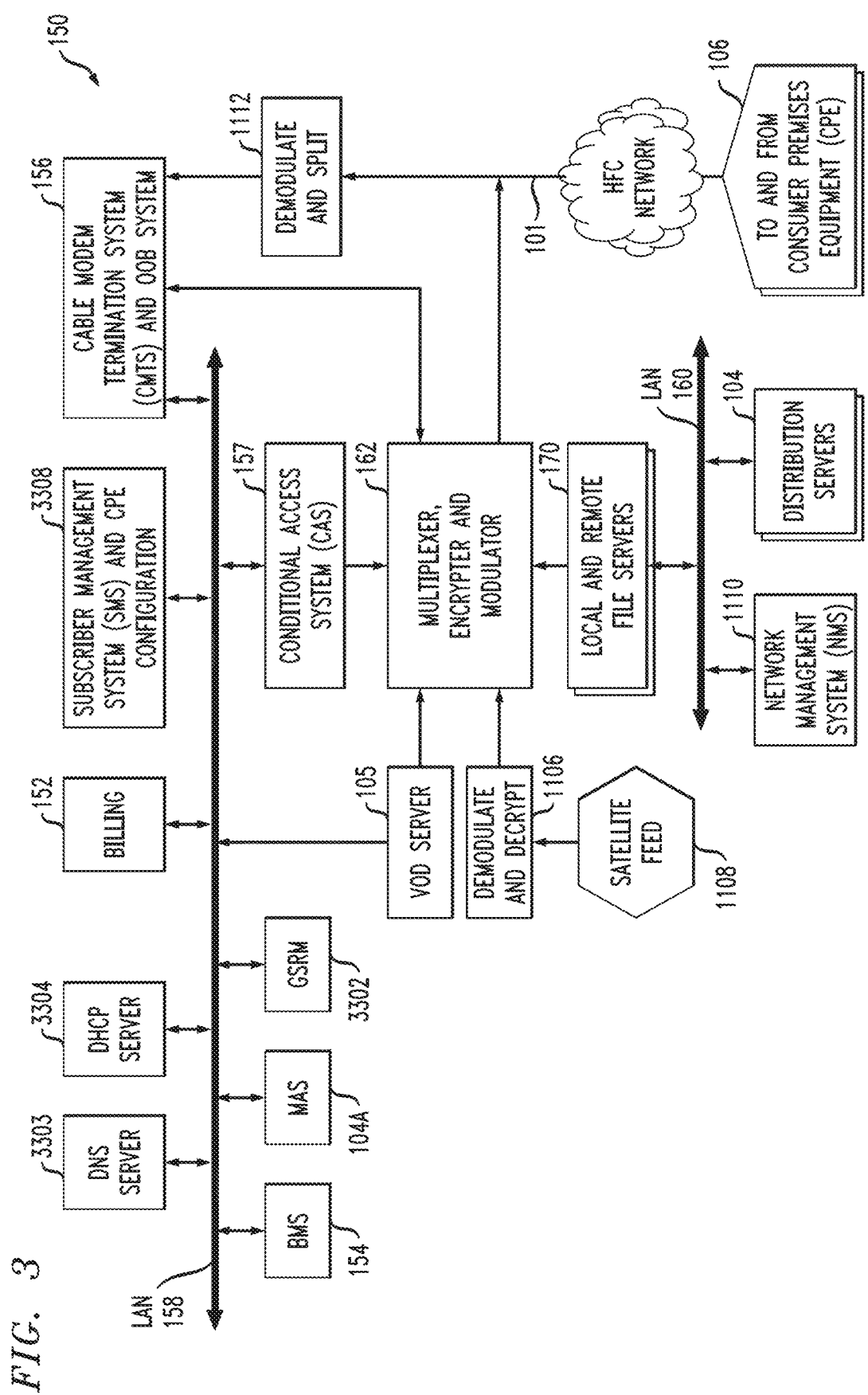
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
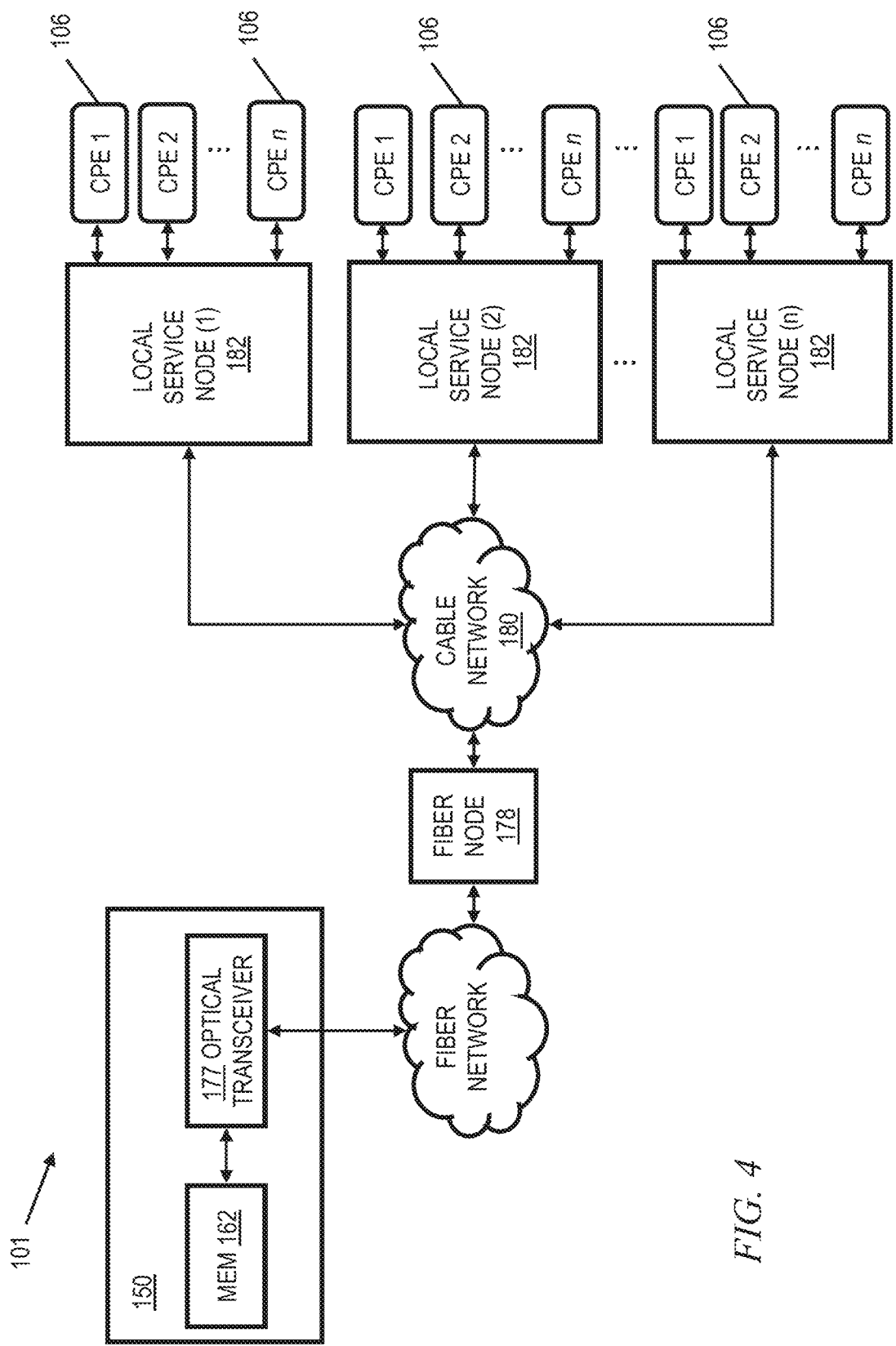
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
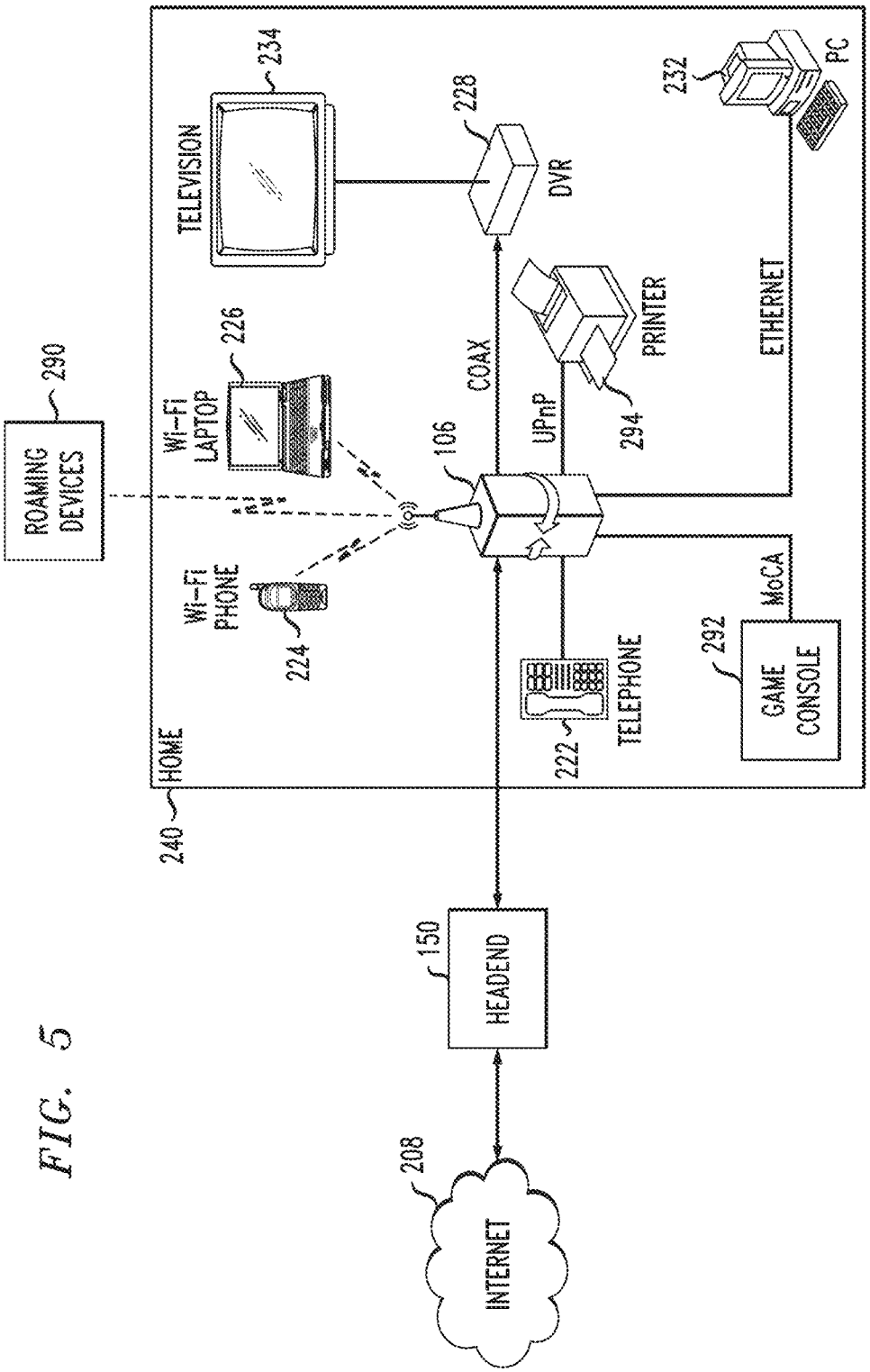
FIG. 5 is a functional block diagram of a premises network, including an exemplary centralized customer premises equipment (CPE) unit, interfacing with a head end such as that of FIG. 3.
Figure 6:
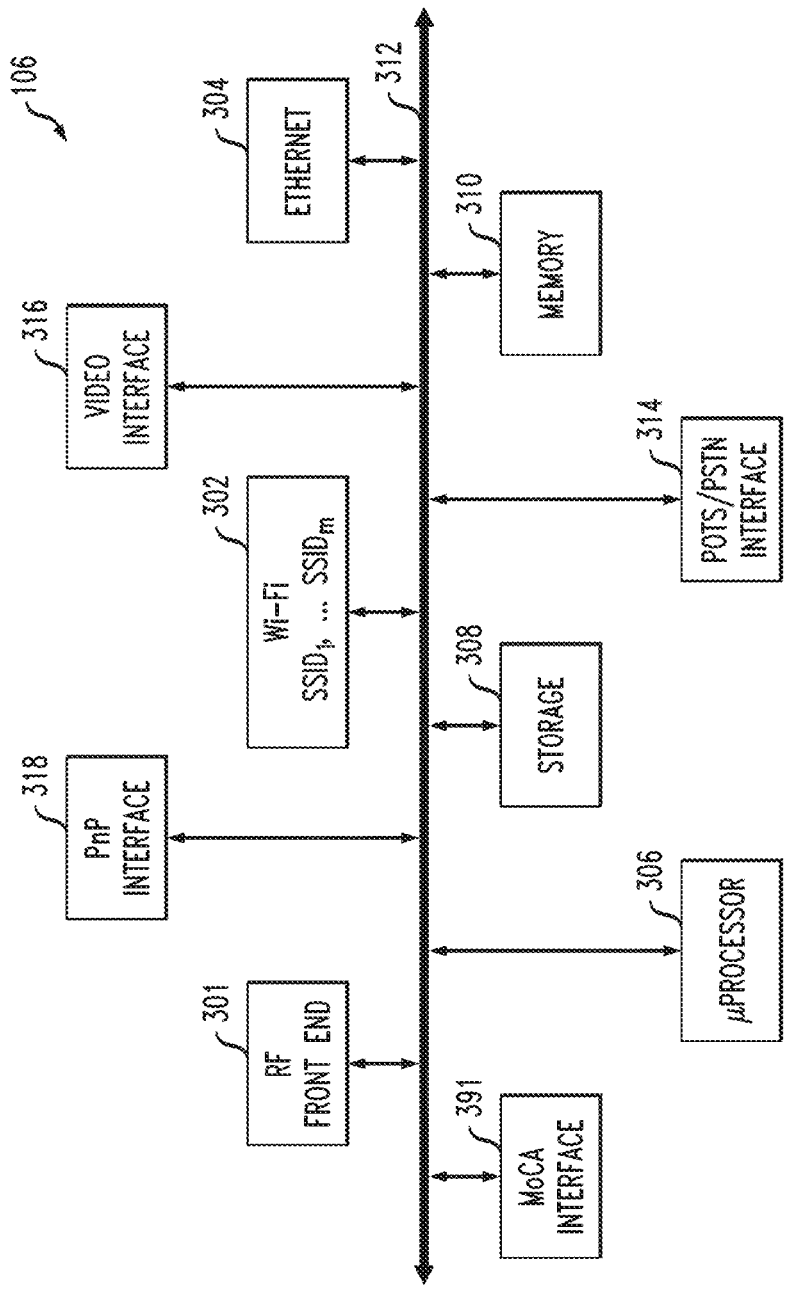
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 18 and 19 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 18:
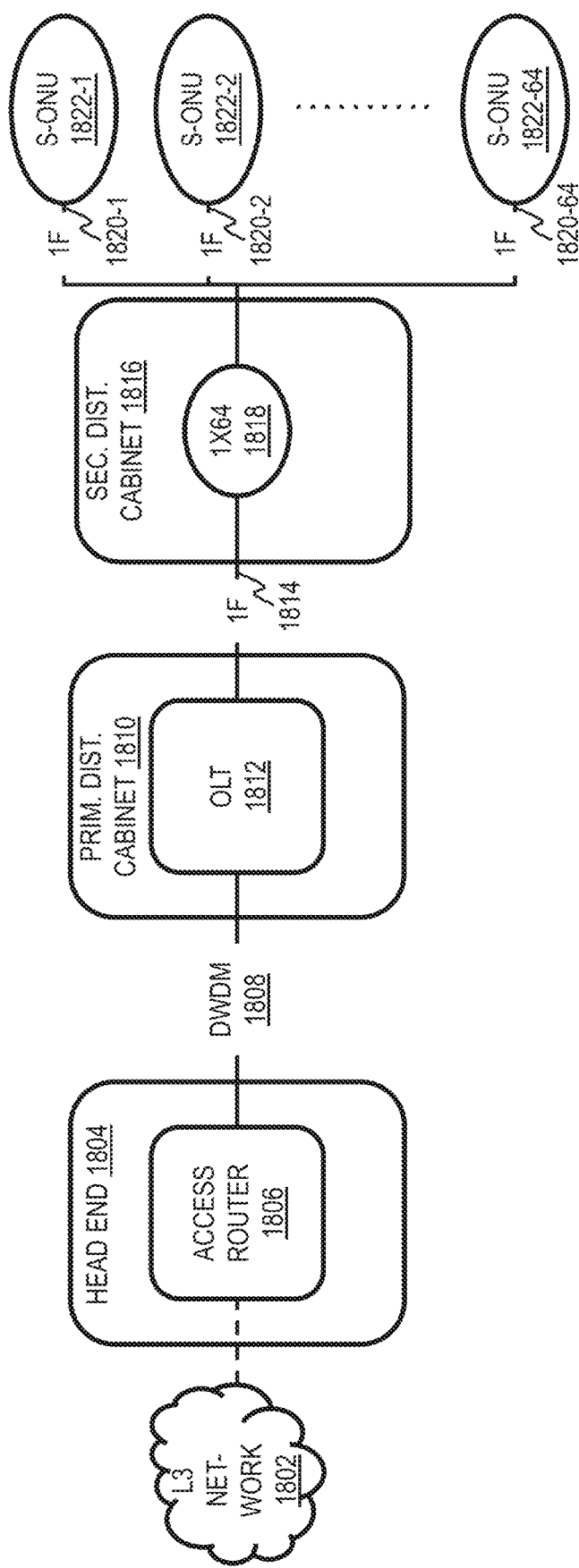
FIG. 18 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 18, L3 network 1802 generally represents the elements in FIG. 1 upstream of the head ends 150, while head end 1804, including access router 1806, is an alternative form of head end that can be used in lieu of or in addition to head ends 150 in one or more embodiments. Head end 1804 is suitable for FTTH implementations. Access router 1806 of head end 1804 is coupled to optical line terminal 1812 in primary distribution cabinet 1810 via dense wavelength division multiplexing (DWDM) network 1808. Single fiber coupling 1814 is then provided to a 1:64 splitter 1818 in secondary distribution cabinet 1816 which provides a 64:1 expansion to sixty-four S-ONUs 1822-1 through 1822-64 (in multiple premises) via sixty-four single fibers 1820-1 through 1820-64, it being understood that a different ratio splitter could be used in other embodiments and/or that not all of the 64 (or other number of) outlet ports are necessarily connected to an S-ONU.

Figure 19:
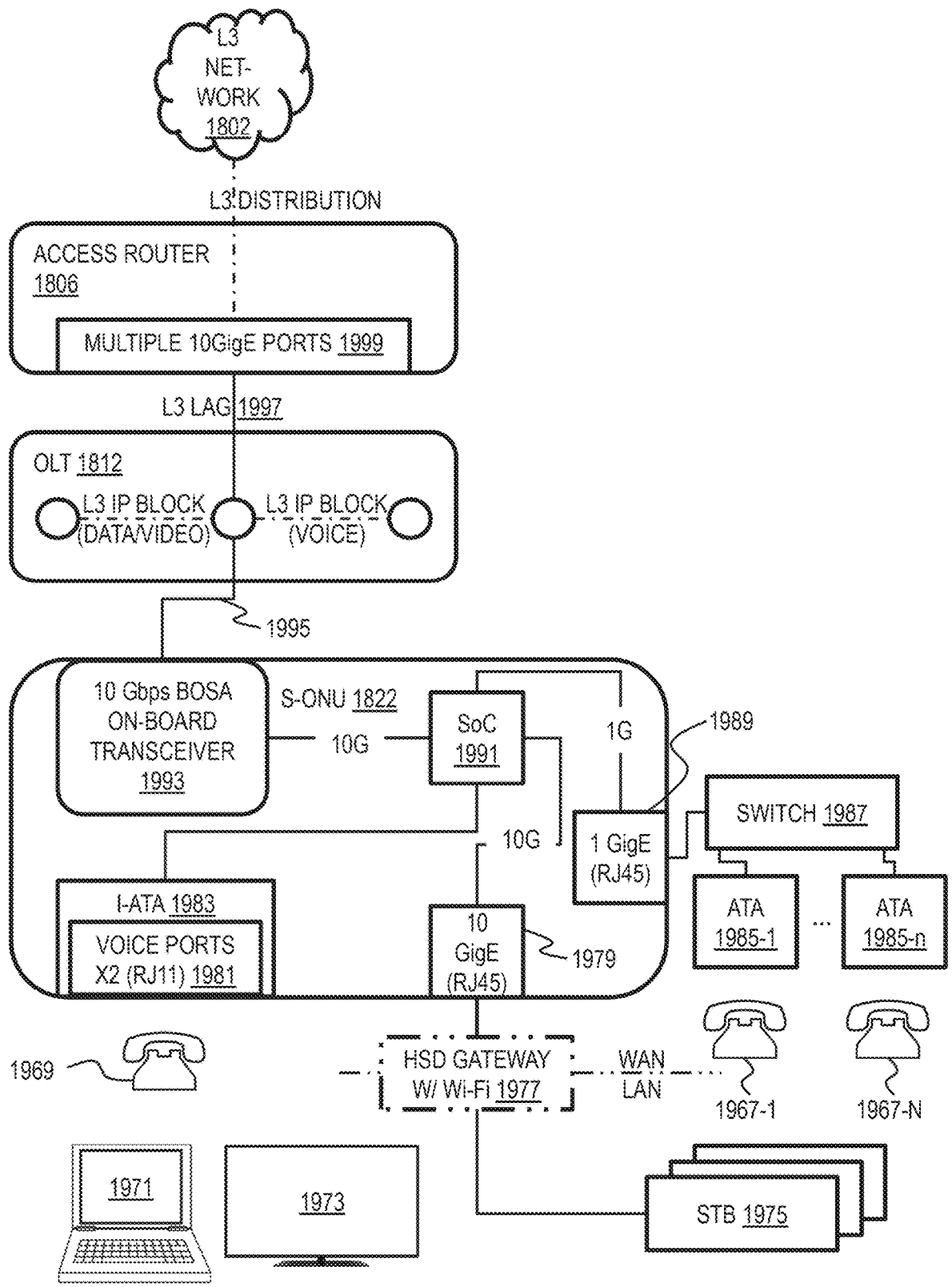
FIG. 19 is a functional block diagram of an exemplary centralized S-ONU CPE unit interfacing with the system of FIG. 18.

Giving attention now to FIG. 19, wherein elements similar to those in FIG. 18 have been given the same reference number, access router 1806 is provided with multiple ten-Gigabit Ethernet ports 1999 and is coupled to OLT 1812 via L3 (layer 3) link aggregation group (LAG) 1997. OLT 1812 can include an L3 IP block for data and video, and another L3 IP block for voice, for example. In a non-limiting example, it is desired to run a speed test between the OLT 1812 and the S-ONU 1822 through a WAN port. In a non-limiting example, S-ONU 1822 includes a 10 Gbps bi-directional optical subassembly (BOSA) on-board transceiver 1993 with a 10G connection to system-on-chip (SoC) 1991. SoC 1991 is coupled to a 10 Gigabit Ethernet RJ45 port 1979, to which a high-speed data gateway 1977 with Wi-Fi capability is connected via category 5E cable. Gateway 1977 is coupled to one or more set-top boxes 1975 via category 5e, and effectively serves as a wide area network (WAN) to local area network (LAN) gateway. Wireless and/or wired connections can be provided to devices such as laptops 1971, televisions 1973, and the like, in a known manner. Appropriate telephonic capability can be provided. In a non-limiting example, residential customers are provided with an internal integrated voice gateway (I-ATA or internal analog telephone adapter) 1983 coupled to SoC 1991, with two RJ11 voice ports 1981 to which up to two analog telephones 1969 can be connected. Furthermore, in a non-limiting example, business customers are further provided with a 1 Gigabit Ethernet RJ45 port 1989 coupled to SoC 1991, to which switch 1987 is coupled via Category 5e cable. Switch 1987 provides connectivity for a desired number n (typically more than two) of analog telephones 1967-1 through 1967-n, suitable for the needs of the business, via external analog telephone adapters (ATAs) 1985-1 through 1985-n. The parameter "n" in FIG. 19 is not necessarily the same as the parameter "n" in other figures, but rather generally represents a desired number of units. Connection 1995 can be, for example, via SMF (single-mode optical fiber).

In addition to "broadcast" content (e.g., video programming), the systems of FIGS. 1-6, 18, and 19 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Bi-Directional Speed Testing of CPE Devices

As noted above, network speed is a pertinent parameter in various types of wired and wireless networks.

Speed tests performed by CPE devices using HTTP (hypertext transfer protocol) typically measure the download and upload rates between the CPE device and the Internet Service Provider (ISP) speed test server. The network throughput test results are currently being sent via techniques known from DSL Forum Technical Report TR-143, "Enabling Network Throughput Performance Tests and Statistical Monitoring," Issue 1, May 2008, expressly incorporated by reference herein in its entirety for all purposes. Such speed tests are typically done for data rates below 400 Mbps. For multi-Gbps data rates, multiple simultaneous TCP (transfer control protocol) connections are typically needed, which is undesirable for many reasons such as increasing measurement overhead and network latency, and decreasing the reliability of the speed test results.

One current application used to measure network bandwidth is called "iPerf"; a useful tool for active measurements of the maximum achievable bandwidth on IP (Internet Protocol) networks. Versions include iPerf2 and iPerf3. The iPerf tool can be used to test either TCP (transmission control protocol) or UDP (user datagram protocol) network throughput. However, the iPerf application lacks the remote execution and collection of results that are needed by the ISP for mass deployment of CPE devices.

The skilled artisan will be familiar with iPerf per se, and, given the teachings herein, will be able to modify current iPerf techniques to implement on or more embodiments. Nevertheless, the following documents are expressly incorporated by reference herein in their entireties for all purposes:

iperf3—iperf3 3.3 documentation, Copyright 2014-2017, Energy Sciences Network (ESnet)
    iperf3—iperf3 FAQ, Copyright 2014-2017, Energy Sciences Network (ESnet)
    iPerf—iPerf3 and iPerf2 user documentation, French iPerf Forum
    Energy Sciences Network (ESnet), Network Test Tools—iperf2/iperf3.

Advantageously, one or more embodiments update the iPerf process flow with introduction of an activity detection mechanism, and provide extensions of the TR-181 data model objects and parameters that are needed to support the speed test for mass CPE deployments. Broadband Forum Technical Report TR-181 "Device Data Model for TR-069" Issue 2 Amendment 2, February 2011, is expressly incorporated by reference herein in its entirety for all purposes. Broadband Forum Technical Report TR-181 "Device Data Model for TR-069" Issue 2 Amendment 8, September 2014, is also expressly incorporated by reference herein in its entirety for all purposes.

One or more embodiments provide CPE speed test techniques implemented through a combination of iPerf 3; Broadband Forum Data Model Definition TR-069 Device: 2.11 Root Object definition tr-181-2-11-0.xml (expressly incorporated herein by reference in its entirety for all purposes)—note especially "Download:1 Profile" and "Upload:1 Profile"; and TR-181 data model object and parameter custom extensions defined herein.

One or more embodiments advantageously provide a mechanism with which to determine if a device is being utilized prior to executing a measurement, to minimize skewing of results. To achieve this, one or more embodiments provide a function referred to as activity detection. Two custom objects, each with four activity detection parameters, are defined with their default values specified in the table of FIG. 16. The two custom objects are:

Device.IP.X_CHTR_Diagnostics.DownloadDiagnostics; and
    Device.IP.X_CHTR_Diagnostics.UploadDiagnostics.

Figure 8:
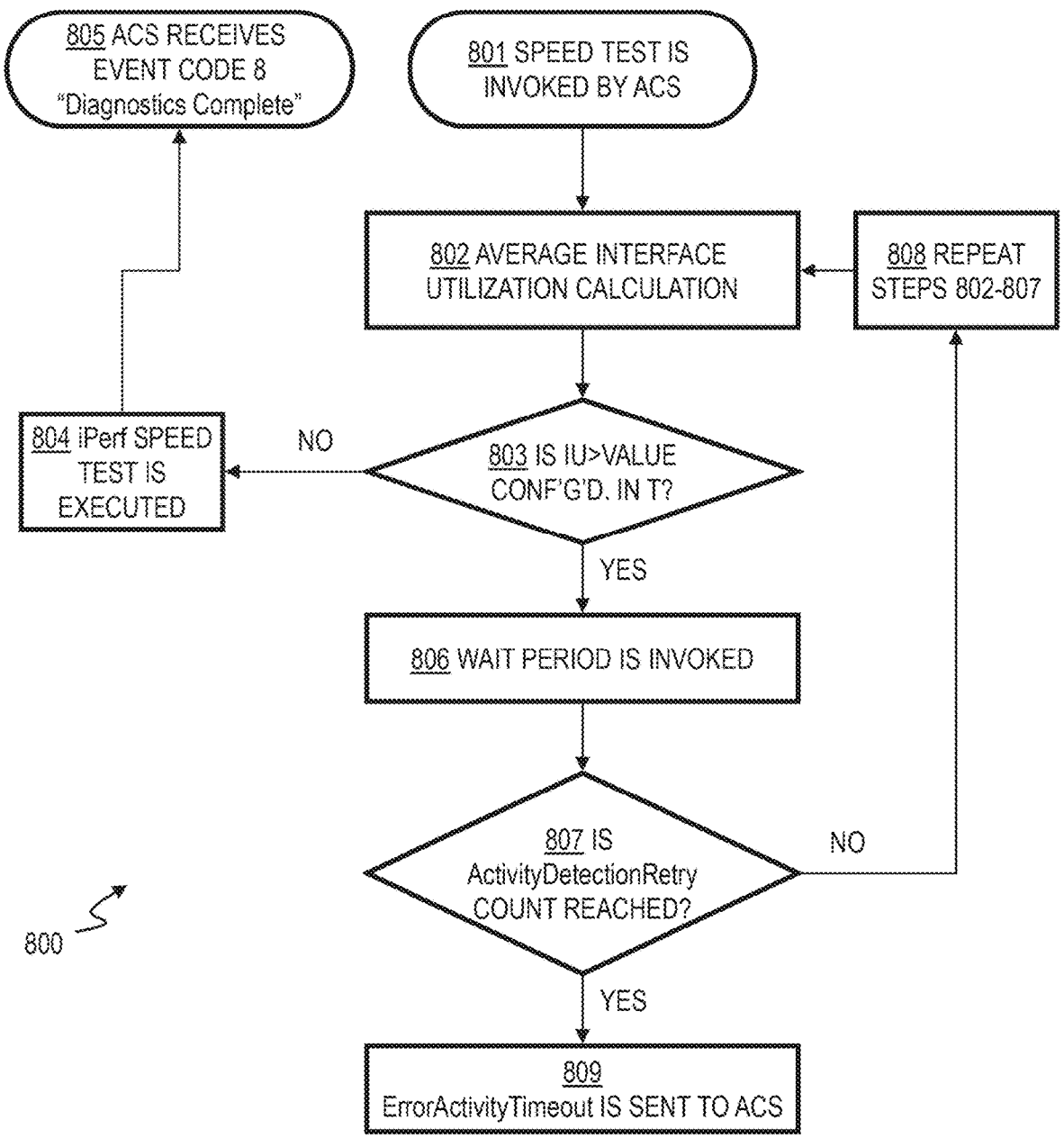
FIG. 8 is a flow chart of an exemplary activity detection mechanism, according to an aspect of the invention.

The four activity detection parameters are: ActivityDetectionThreshold, ActivityDetectionRetry, ActivityDetectionRetryWait, and ActivityDetectionPeriod. FIG. 8 illustrates an exemplary process flow for this mechanism. In the event that the device becomes "in use" after the activity detection has completed, the device preferably gives priority to the subscriber traffic. More specifically, in one or more embodiments, any device traffic with the source or destination of the server designated in DownloadURL or UploadURL is given a lower priority compared with subscriber traffic. The skilled artisan will appreciate that, in accordance with well-known standards from the Broadband Forum, if techniques herein are implemented by an entity other than Charter Communications, the other entity can appropriately replace "CHTR" in the custom objects with its own name.

Referring to flow chart 800 of FIG. 8, the activity detection process works as follows in one or more embodiments. In step 801, the speed test is invoked by the auto-configuration server (ACS) 999 (see FIG. 9 and step 902 thereof, discussed below). In step 802, the CPE device 997 (see FIG. 9) measures the average Interface Utilization (IU) over a given period, as configured in the above-mentioned ActivityDetectionPeriod parameter. This is the interface represented in Device.IP.Interface.1. The device uses the combined byte counters Device.IP.Interface.1.Stats.BytesSent and Device.IP.Interface.1.Stats.BytesReceived to calculate the average IU. The average IU can be calculated according to the following equation:

$$8((\text{bytes sent} + \text{bytes received})/\text{Interface Speed}/\text{ActivityDetectionPeriod}).$$

For example, if the interface speed=1 Gbps, the equation reduces to:

$$8(\text{bytes sent} + \text{bytes received})10^{-9}/\text{ActivityDetectionPeriod}$$

In decision block 803, it is determined whether IU is greater than the value configured in "T?"; the result from step 802 is compared with the value configured in the ActivityDetectionThreshold parameter (T). In step 804, assuming that decision block 803 yields a "NO," an iPerf Speed Test is executed. That is to say, if the step 802 result is lower than the value of T, as determined in block 803, then the CPE device starts immediately to execute the iPerf speed test. In step 805, the ACS receives Event Code 8 "Diagnostics Complete." In other words, once the iPerf speed test execution is completed, the ACS receives event code 8 "Diagnostics Complete" and the DiagnosticsState is set to "Complete."

On the other hand, as seen at step 806, if decision block 803 yields a "YES"; i.e., if the step 802 result is higher than the value of T, then the device invokes a wait period as configured in the ActivityDetectionRetryWait parameter before executing another IU calculation. In decision block 807, it is determined whether the maximum value of the ActivityDetectionRetry parameter has been reached. If not, proceed to step 808 and repeat steps 802-807 until the maximum value configured in the ActivityDetectionRetry parameter is reached. On the other hand, if decision block 807 yields a YES, proceed to step 809 wherein "ErrorActivityTimeout" is sent to the ACS. That is to say, if the maximum value for the ActivityDetectionRetry parameter is reached, the device is unable to initialize the iPerf test, and the DiagnosticState is set to ErrorActivityTimeout and sent to the ACS.

It should be pointed out that an ISP or similar party may restart the iPerf speed test based on the DiagnosticsState value received by the ACS, when appropriate.

Thus, to summarize, FIG. 8 details an exemplary activity detection mechanism within the CPE, where the device is instructed to check the interface utilization the customer will be using prior to executing the test. The test is first started by the ACS. The device receives the command form the ACS to begin the diagnostics. The device will then begin monitoring the customer's WAN (wide area network) interface typically, depending on the device type, for usage, over a predetermined amount of time, which is configurable. Once that time period is elapsed, if the usage of that interface is lower than whatever has been set for that mechanism, the device will then execute a diagnostic. On the other hand, if the result is higher than the threshold which has been configured, the device then goes into a wait cycle for a configurable amount of time, and then goes back and checks interface utilization again. This cycle repeats three times by default but this is also configurable and a value other than three could be used in other embodiments, e.g., 1, 10, . . . . Based on the result, the device will either run the test or not; if it runs the test, it then interfaces with the speed test server and then provides those results up to the auto-configuration server (ACS). If the device runs out of retries, it sends another message to the ACS indicating that it has timed out due to the above-described mechanism. In one or more embodiments, the ACS may also decide to wait an arbitrary amount of time and try to re-run the speed test.

The iPerf application has proven valuable for network performance testing and it is capable of reaching multi-gigabit rates. There are two main versions, iPerf 2.x and iPerf 3.x; these versions are not compatible with each other. This incompatibility stems from iPerf 3 being a complete rewrite of the program. In order to minimize network complexity, one or more embodiments employ only iPerf 3. Of course, other embodiments could use only iPerf 2 or a mixture of both versions of iPerf.

In one or more embodiments, complete functionality is expected from iPerf, such that features or options should not be excluded. One current issue with using the iPerf application is the lack of remote execution and collection of results. One or more embodiments address this problem by expanding the existing TR-181 data model elements to allow for configuration and result retrieval of iPerf. While iPerf3 does not currently support bi-directional testing explicitly, the methodology of iPerf3 more closely matches TR-143 by executing tests independently. One potentially pertinent difference between iPerf2.x and iPerf3.x is in how iPerf3.x is configured. The iPerf3.x configuration includes the "–R" flag (for reverse) set on the device, where this "–R" flag is not needed for iPerf 2. This will initiate the download test as opposed to the upload test.

Certain types of CPE devices ("Bridge Devices") operate in a bridge-only mode, including but not limited to DOCSIS cable modems with eMTAs (Embedded Media Terminal Adapters, a generic term to describe a cable modem with voice functionality) as well as Ethernet passive optical network (EPON) optical network units (ONUs) with Analog Terminal Adapters (ATAs) for voice functionality. These devices do not perform network address translation/port address translation (NAT/PAT) functions, and as such, additional requirements are needed in some embodiments. These devices may require an additional IP lease to be obtained for diagnostic activity. In this scenario, the number of IP addresses allowed should be increased by one. This can be controlled via the device configuration file with the appropriate MIB (management information (data)base) set. In one or more embodiments, the additional IP includes IPv6 obtained through DHCPv6 as opposed to SLAAC (stateless address auto-configuration). In some embodiments, the device initializes the CMCI (Cable Modem to CPE Interface) Ethernet port after the lease is obtained.

In one or more embodiments, the CPE device behavior is specified while the speed test is underway. In the event that a device becomes in use by the subscriber after the activity detection mechanism completes its check and an iPerf test has been started, the iPerf test is not abandoned, but the device gives priority to traffic originating and destined for the subscriber interface. Traffic originating with the device itself for the purpose of iPerf is given a lower priority (an exemplary mechanism to accomplish this is discussed elsewhere herein).

It should be pointed out that in some cases the iPerf speed test results may not reflect the actual available user downstream or upstream bandwidth. In this case, the speed test results will be tagged as 'compromised speed test results' to be re-run at a later time. This issue can arise, for example, where the activity detection mechanism indicates that it is OK for the speed test to begin, but where activity later commences after the start of the speed test. As previously discussed, the ACS may decide to wait an arbitrary amount of time depending on various factors, and re-run the iPerf speed test to obtain 'uncompromised speed test results.' Such results would be obtained, for example, where the activity detection mechanism indicates that it is OK for the speed test to begin, and where activity later does not commence after the start of the speed test, until the speed test is complete.

Consider an example wherein a subscriber begins streaming HD video after activity detection is complete. The exemplary subscriber is configured for 200 Mbps and the video bit rate is 7 Mbps. Accordingly, 200 Mbps–7 Mbps=193 Mbps would be the expected iPerf result. The delta will be shown by comparing TestBytesRecieved versus TotalBytesRecieved.

Figure 7:
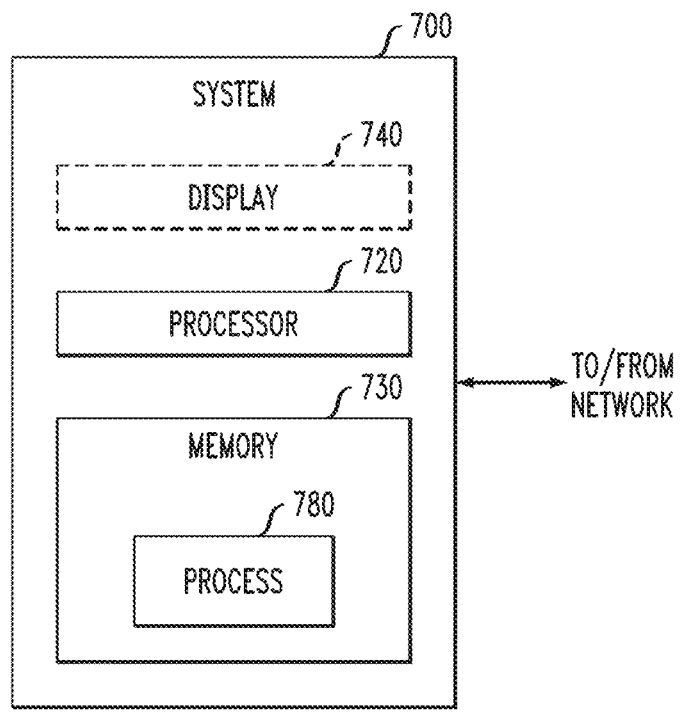
FIG. 7 is a block diagram of a computer system useful in connection with one or more aspects of the invention.
Figure 9:
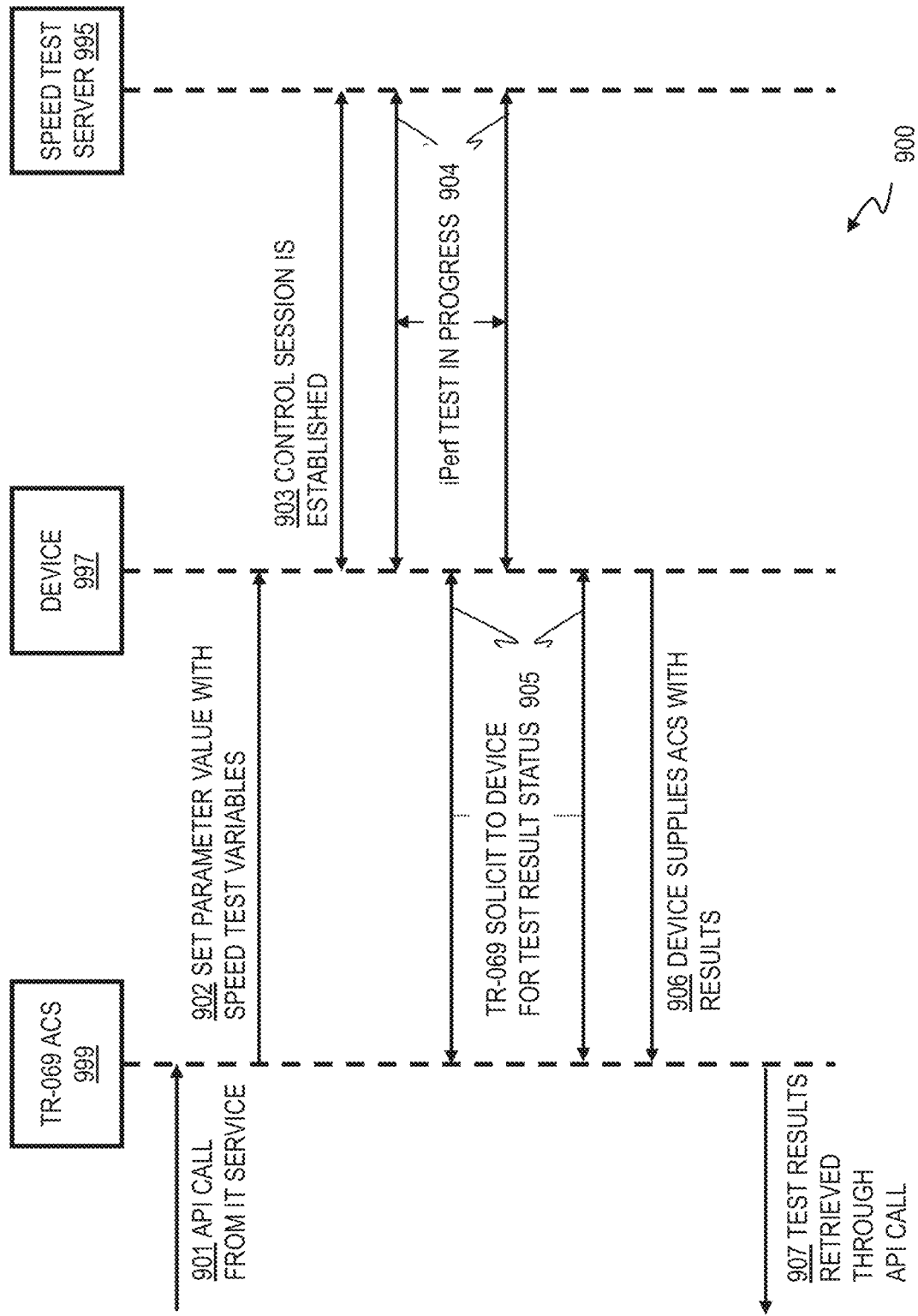
FIG. 9 is a combined block and process flow diagram, according to an aspect of the invention.

Refer now to diagram 900 of FIG. 9, which depicts an exemplary process flow diagram for an iPerf speed test, including initiating and retrieving throughput test results. Diagram 900 omits any logic associated with the activity detection mechanism, to avoid clutter. Note the ACS 999 (e.g., TR-069); device (CPE) 997; and speed test server 995. Elements 106 and 1822 discussed above are non-limiting examples of devices 997. FIG. 7, discussed elsewhere, shows an exemplary computer which could be used to implement servers 999 and/or 995. In step 901, an API call is made to the ACS 999 from an IT (information technology) service, representing a CSR (Customer Service Representative) or customer invoking the test. Aspects of an exemplary speed test API are discussed elsewhere herein. In step 902, the ACS 999 performs a SetParameterValues RPC (remote procedure call) to the device 997, containing information needed to configure and execute the UploadDiagnostics or DownloadDiagnostics function of a device.

In step 903, the device 997 initiates a control session to the server 995 using the information provided in the DownloadURL or UploadURL (refer to the table of FIG. 16 and the above-mentioned Broadband Forum Technical Report TR-181 "Device Data Model for TR-069" Issue 2 Amendment 2, February 2011 and Broadband Forum Technical Report TR-181 "Device Data Model for TR-069" Issue 2 Amendment 8, September 2014). In step 904, the device 997 initiates a forward or a reverse iPerf test via the –R option with the Speed Test Server 995. In step 905, the ACS 999 receives Event Code 8 "DIAGNOSTICS COMPLETE" once the diagnostic has completed. In step 906, the speed test results are retrieved by the ACS 999 using the GetParameterValues RPC. In step 907, an IT service API call is made to retrieve the results from the ACS 999; the same are stored within a database for consumption.

In one or more embodiments, the logic depicted in FIG. 8 is implemented on the CPE device 997 in FIG. 9. The logic can be implemented, for example, in software or firmware on the CPE device. In FIG. 9, the device is located, for example, in the premises (e.g. 240) of a subscriber. In a non-limiting example, a centralized ACS 999 is located in a national data center 1098 with a decentralized (regional) speed test server 995 located in a regional data center 1048, head end 150, or MCHE 1096. Note that there can be more than one NDC 1098 and more than one RDC 1048. Other embodiments could locate the components differently.

Thus, in one or more embodiments, the ACS 999 receives an API call from an IT service, to invoke the speed test on a customer's behalf (e.g. customer complains his or her connection is too slow), or on behalf of a CSO (customer service organization), or based on a scheduled process (e.g. periodic checks to verify proper network operation). The ACS 999 sends those values down to the device 997. The device begins the activity detection method of FIG. 8. In some embodiments, there is a control session established by iPerf outside of the data plane. As will be appreciated by the skilled artisan, iPerf is freely available open source software; in one or more embodiments, it executes on both the device 997 and server 995.

In a non-limiting example, the aforementioned IT service can be a data warehouse or other data store that makes an API call to the ACS 999 and holds historical data.

Figure 17:
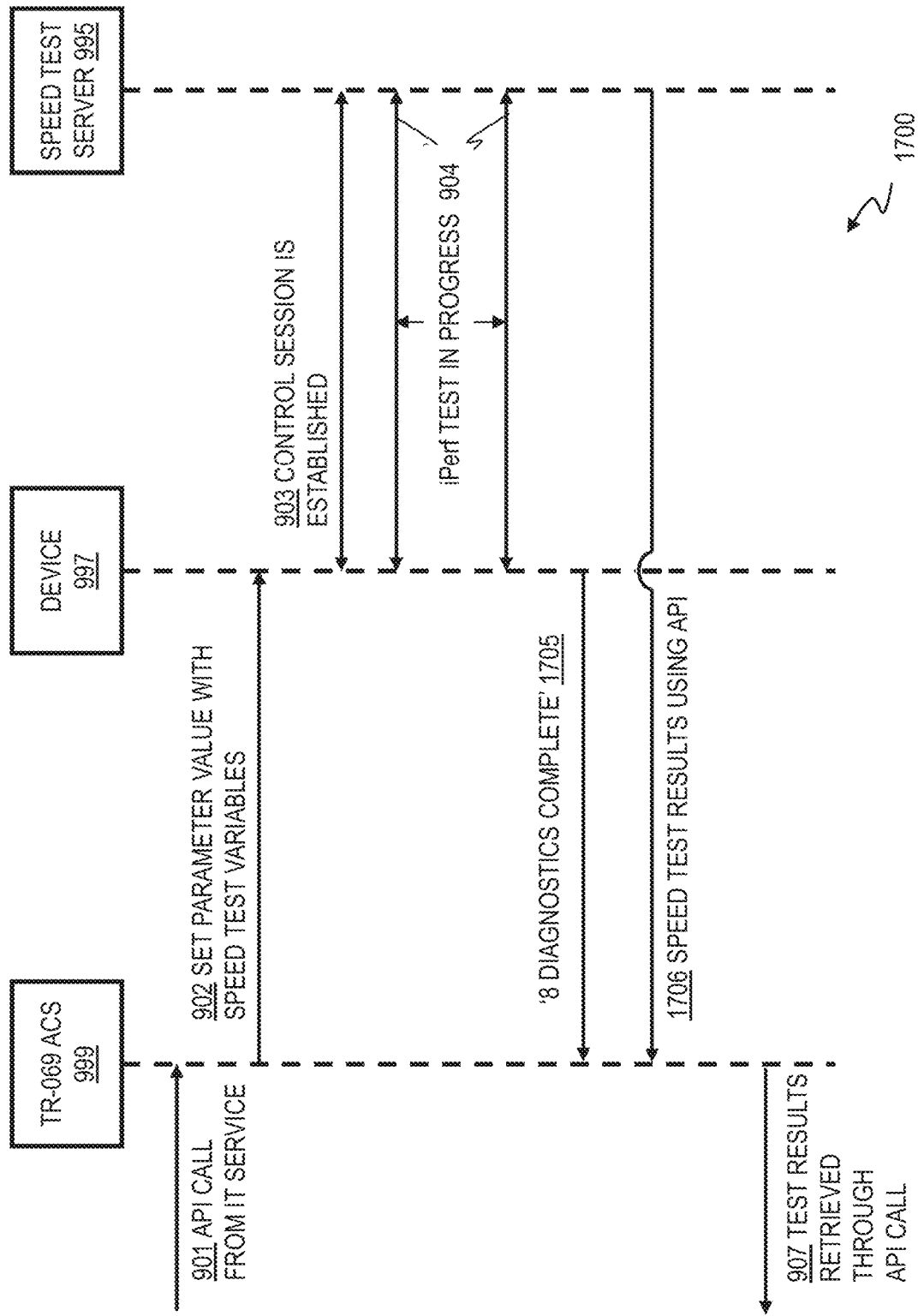
FIG. 17 is a combined block and process flow diagram, according to an aspect of the invention.

In an approach 1700 shown in FIG. 17, as compared to the approach of FIG. 9, the Speed Test Server 995 provides the results directly to the ACS using an API as shown in FIG. 15. In some instances, the Speed Test Server code is advantageously written from scratch, so that the results can be derived there (i.e. on the speed test server), such that there is no need to further involve the ACS 999 or the Device 997 in reporting those results. The approach of FIG. 9 can be used in other cases. Note that in FIG. 17, elements and data flows/steps similar to FIG. 9 have received the same reference character. In FIG. 17, once the iPerf test is completed in step/flow 904, Device 997 sends an '8 DIAGNOSTICS COMPLETE" message to ACS 999, as seen at 1705. Server 995 sends the speed test results to ACS 999 directly, using the API, in step/flow 1706, and the test results are then retrieved as before in step/flow 907.

The table of FIG. 16 includes exemplary custom extensions to the TR-181 data model objects and parameters that are employed with the iPerf speed test in one or more embodiments. This list does not include any base objects for the device to be able to communicate with an ACS. The skilled artisan will understand the device communications with the ACS as defined in the CPE WAN communication protocol (CWMP). The CWMP is the communication protocol between the ACS and CPE that defines a mechanism for secure auto-configuration of a CPE and other CPE management functions in a common framework. In addition, a custom error message for both Upload and Download diagnostics has been added to indicate that the device will not complete the test due to the Activity Detection Mechanism; namely "ErrorActivityTimeout (READ ONLY)." This is defined at 1617 in FIG. 16B for download and at 1643 in FIG. 16L for upload. Thus, one or more embodiments provide a TR-181 data model extension, adding some additional parameter objects that enable the CPE device 997 to send the iPerf results back to the ACS server 999. In one or more embodiments, certain error codes or errors can be seen in the diagnostic states, providing notifications, where applicable, as to why a test failed.

Still referring to FIG. 16, note that the standard TR-181 data model does not include a representation for jitter. One or more embodiments extend the TR-181 data model to include UDP Jitter in milliseconds, as seen at 1601 in FIG. 16A and 1625 in FIG. 16J. The four activity detection parameters mentioned above, namely, ActivityDetectionThreshold, ActivityDetectionRetry, ActivityDetectionRetryWait, and ActivityDetectionPeriod, are defined at 1603, 1605, 1607, and 1609, respectively, in FIG. 16A for download, and at 1627, 1629, 1631, and 1633, respectively, in FIGS. 16J-16K, for upload.

Within the DownloadURL name in FIG. 16A, note the format of the iPerf URL at 1611 and the invocation of the reverse mode by the "–R" option at 1613. Within the DownloadTransports name in FIG. 16B, note the specification of iPerf3 1615. Within the ROMTime name in FIGS. 16D-E, note the pertinent definition for iPerf at 1619. Within the BOMTime name in FIG. 16E, note the pertinent definition for iPerf at 1621. Within the EOMTime name in FIG. 16E, note the pertinent definition for iPerf at 1623.

Within the UploadURL name in FIG. 16K, note the format of the iPerf URL at 1635 and the invocation of the reverse mode by the "–R" option at 1637. Within the UploadTransports name in FIG. 16K, note the specification of iPerf2 at 1639 and iPerf3 at 1641. Within the ROMTime name in FIG. 16O, note the pertinent definition for iPerf at 1645. Within the BOMTime name in FIG. 16O, note the pertinent definition for iPerf at 1647. Within the EOMTime name in FIG. 16P, note the pertinent definition for iPerf at 1649.

Please note that FIG. 16 is in the form of an exemplary specification, wherein terms such as MUST, MUST NOT, SHOULD, SHOULD NOT, and MAY are used. These terms are exemplary and not meant to limit the scope of the appended claims unless expressly recited therein; in other embodiments, things that are mandatory in the example could be optional and/or things that are optional in the example could be mandatory. Furthermore, the skilled artisan will be familiar with the various RFCs and other documents referred to in FIG. 16, all of which are hereby expressly incorporated herein by reference in their entireties for all purposes.

As used herein, "CWMP" refers to CPE WAN Management Protocol; "SPV" refers to the SetParameterValues RPC; and "GPV" refers to the GetParameterValues RPC. An "Object" is an internal node in the name hierarchy, i.e., a node that can have Object or Parameter children. An Object name is a Path Name that typically includes one or more parameters. A "Parameter" is a name-value pair that represents part of a CPE's configuration or status. A Parameter name is a Path Name that belongs to specific data model objects.

Thus, a pertinent aspect of one or more embodiments is the activity detection mechanism. One or more embodiments advantageously address a customer complaint for a speed test, execute diagnostics remotely, and ensure good results. In one or more embodiments, one reason why it is desirable to know whether there is activity is because the speed test will degrade the performance of the CPE, such that if a speed test is carried out while someone is using the CPE, there will be a performance issue.

Aspects of an exemplary speed test API will now be discussed. In one or more embodiments, this API is used to initiate a speed test on a device. It is executed, for example, via HTTP POST (POST is a request method supported by the HTTP protocol used by the World Wide Web; HTTP=Hypertext Transfer Protocol). The speed test API can be executed synchronously (i.e., wait for speed test to complete) or asynchronously. Asynchronous execution is believed to be advantageous in one or more embodiments, since the speed test operation can take a considerable amount of time (as compared to a typical HTTP request) and the client will need to account for such in terms of connect/request timeouts if synchronous mode is selected. During asynchronous operation, the result of the speed test is published to a Kafka queue with the speed test ID provided in the API response as an identifier. As will be appreciated by the skilled artisan, Kafka is, in essence, a message queueing system with the ability to support pub/sub (publish/subscribe), scaling out over many servers, and replaying of messages.

The table of FIG. 10 shows exemplary definitions associated with the request payload. Please note AWG=Advanced Wireless Gateway, WR=Wireless Router, and CM=Cable Modem. Note that a globally unique identifier (GUID) or universally unique identifier (UUID) is a 128-bit number used to identify information in computer systems.

FIG. 11 shows pseudocode for an exemplary request payload. It will be appreciated that 0123456789ab is a non-limiting example of a 12-digit hexadecimal MAC address.

Regarding response payload definitions, note that during synchronous operation, both the request and complete fields defined in the tables of FIGS. 12 and 13 will be present in the response. All fields will be present for asynchronous operation, in one or more embodiments. Note that a fully qualified domain name (FQDN) is a domain name that specifies its exact location in the tree hierarchy of the Domain Name System (DNS). Note also that EID=Endpoint Identifier.

The table of FIG. 14 presents pseudocode for an exemplary response, while the table of FIG. 15 presents pseudocode for exemplary results.

By way of review and provision of additional information, one or more prior art techniques employ the HTTP protocol. The network throughput test results are sent via TR-143. Such speed tests are typically done for data rates below 400 Mbps. For multi-Gbps data rates, multiple simultaneous TCP connections are typically needed in prior art techniques, which is undesirable for many reasons such as increasing measurement overhead and network latency. One or more embodiments, in contrast, are based on the iPerf speed test. One or more embodiments solve the problem of remote execution and collection of results that are needed by the ISP for mass deployment of CPE devices. In one or more embodiments, this is done by updating the iPerf process flow with introduction of the activity detection mechanism, and by extending the TR-181 data model objects and parameters that are needed to support the speed test for mass CPE deployments. Accordingly, in one or more embodiments, the addition of the activity detection and extended data model objects and parameters overcomes the 400 Mbps prior art limitation. This is because iPerf allows for testing at rates greater than 400 Mbps (unlike prior art techniques using HTTP and TR-143). However, heretofore, iPerf has been incapable of mass testing. However, by using activity detection and data object modification as disclosed herein, iPerf can now be used to achieve mass testing at rates in excess of 400 Mbps. In one or more embodiments, activity detection helps ensure good results by reducing or eliminating negative impact on the customer. Furthermore, the data object modification as disclosed herein permits controlling and running the tests as well as sending the test results back to the requester.

Recapitulation

Given the discussion thus far, and with attention again to FIGS. 8, 9 and 17, it will be appreciated that, in general terms, an exemplary method, according to an aspect of the invention, includes the step 801 of obtaining, at a customer premises equipment (CPE) device 997 in a broadband network, an invocation of a speed test by an auto-configuration server (ACS) 999. The invocation includes an activity detection threshold (e.g., "ActivityDetectionThreshold") and an activity detection period (e.g., "ActivityDetectionPeriod"). A further step 802 includes, responsive to the invocation, determining average interface utilization for the customer premises equipment (CPE) device over the activity detection period. A still further step includes, responsive to the determining indicating that the average interface utilization for the customer premises equipment (CPE) device over the activity detection period does not exceed the activity detection threshold (block 803 returns a "NO"), the customer premises equipment (CPE) device cooperating with a speed test server 995 to execute a speed test on the customer premises equipment (CPE) device using a speed test tool (step 804).

In one or more embodiments, the invocation includes the speed test server sending the result to the ACS via an Application Programming Interface (API) call.

The speed test tool can be configured, for example, to return maximum bandwidth between the customer premises equipment (CPE) device and the speed test server. In some cases, the speed test is executed for at least one of Transmission Control Protocol (TCP) and User Datagram Protocol (UDP) data streams.

In one or more embodiments, the activity detection threshold and the activity detection period are obtained as TR-181 data model object and parameter custom extensions. Refer to FIG. 16. Further, in one or more embodiments, in the executing step, the speed test is an iPerf speed test, such as an iPerf3 speed test.

The iPerf3 speed test can be a forward speed test and/or a reverse speed test (see discussion of −R flag).

It is worth noting that exemplary advantages of iPerf, used in one or more embodiments, include: (A) Provides the maximum bandwidth available between the server and the client device; (B) Increased reliability of speed test results compared to HTTP, particularly if the speed test server and client device are located in different geographic areas; and (C) Open-source software that can designed to be used on various platforms such as Linux and Windows.

In some instances, of course, block 803 may yield a "YES" rather than a "NO." Thus, in some instances, further steps include obtaining, at the customer premises equipment (CPE) device 997 in the broadband network, a second invocation of a speed test by the auto-configuration server (ACS) 999. The second invocation includes a second activity detection threshold, a second activity detection period, and an activity detection retry wait period. The parameters are designated as "second" for linguistic clarity, it being understood that the values could be the same as, or different from, the parameters associated with the first invocation. Also, an activity detection retry wait period would typically have been specified in the first invocation, but is not mentioned because it was not needed (803 "NO"). A further step includes, responsive to the second invocation, determining average interface utilization for the customer premises equipment (CPE) device over the second activity detection period (step 802 repeated). A further step includes, responsive to the determining indicating that the average interface utilization for the customer premises equipment (CPE) device over the activity detection period does exceed the second activity detection threshold (i.e. this time block 803 returns a "YES"), waiting for the activity detection retry wait period (step 806) and then re-determining the average interface utilization for the customer premises equipment (CPE) device (repeat steps 802-807 as per 808, assuming retry count not reached yet).

The second activity detection threshold, second activity detection period, and activity detection retry wait period can be obtained as TR-181 data model object and parameter custom extensions. Refer to FIG. 16.

In one or more embodiments, the obtaining of the second invocation further includes an activity detection retry count. An activity detection retry count would typically also be obtained in the first invocation but is not mentioned as it was not needed (803 "NO"). Further steps include, responsive to the re-determining indicating that the average interface utilization for the customer premises equipment (CPE) device over the activity detection period still exceeds the second activity detection threshold (803 "YES" again), determining whether the activity detection retry count has been reached (decision block 807); and, responsive to the determining indicating that the activity detection retry count has not been reached (block 807 returns a "NO"), again re-determining the average interface utilization for the customer premises equipment (CPE) device (repeat steps 802-807 again as per step 808).

In one or more embodiments, the second activity detection threshold, the second activity detection period, the activity detection retry wait period, and the activity detection retry count are obtained as TR-181 data model object and parameter custom extensions. Refer to FIG. 16.

In one or more embodiments, the average interface utilization is determined in step 802 using the total number of bytes sent and bytes received over a given period as configured in the ActivityDetectionPeriod parameter.

In some cases, the average interface utilization for the customer premises equipment (CPE) device increases above the activity detection threshold over a subsequent activity detection period (see discussion above of person beginning to watch an HD video, e.g.), during execution of the speed test. Responsive to the average interface utilization for the customer premises equipment (CPE) device increasing above the activity detection threshold over the subsequent activity detection period, one or more embodiments prioritize subscriber traffic over traffic associated with the iPerf3 speed test. In such cases, for example, the CPE checks the traffic with the source or destination of the server designated in DownloadURL or UploadURL, and gives it a lower priority compared with all other subscriber traffic.

In some cases (see FIG. 9), an even further step 906 includes sending results of the speed test from the customer premises equipment (CPE) device to the auto-configuration server (ACS).

On the other hand (see FIG. 17), in some cases an even further step 1706 includes sending results of the speed test from the speed test server to the auto-configuration server (ACS).

The invocation of the speed test can be obtained at the customer premises equipment (CPE) device 997 as, for example, a first remote procedure call (RPC), responsive to the auto-configuration server (ACS) obtaining a first application programming interface (API) call from an IT service, as per 901 in FIG. 9 and FIG. 17. Further, the results of the speed test can be sent from the customer premises equipment (CPE) device 997 to the auto-configuration server (ACS) 999 via retrieval by the auto-configuration server (ACS) as a second remote procedure call (RPC), in turn for retrieval by the IT service from the auto-configuration server (ACS) via a second application programming interface (API) call, as per 907 in FIG. 9. Alternatively, the results of the speed test can be sent from the speed test server to the auto-configuration server (ACS), as per 1706 in FIG. 17, in turn for retrieval by the IT service from the auto-configuration server (ACS) via a second application programming interface (API) call.

In some cases, where the customer premises equipment (CPE) device is a bridge-only device which does not perform network address translation (NAT) or port address translation (PAT), a further step includes the customer premises equipment (CPE) device obtaining an additional internet protocol address lease prior to executing the speed test.

In another aspect, an exemplary apparatus includes a memory (e.g. 310), at least one processor (e.g. 306) coupled to the memory, at least one wide area network (WAN) port, and a non-transitory persistent storage medium (e.g. 308) that contains instructions (e.g. one or more software and/or firmware modules) which, when loaded into the memory, configure the at least one processor to carry out or otherwise facilitate any one, some or all of the method steps described herein. The apparatus could be, for example, a customer premises equipment (CPE) device 106, 997, 1822, two-box solution, etc. In the S-ONU 1822, the SoC 1991 can include a processor and memory, and can include and/or interface with persistent storage and/or additional memory. The WAN port could be an Ethernet port, for example. In case of an ONU, the WAN port can be, for example, a fiber port capable operating at 1/2.5/5/10 Gbps Ethernet speeds. In the two-box solution, the WAN port could be that of a router (or that of a cable modem).

In still another aspect, an exemplary system includes a customer premises equipment (CPE) device 997 (such as 106, 1822, two-box solution, etc.); optionally an auto-configuration server (ACS) 999 coupled to the customer premises equipment (CPE) device; and a speed test server 995 coupled to the customer premises equipment (CPE) device. The customer premises equipment (CPE) device is configured to carry out or otherwise facilitate any one, some or all of the method steps described herein, in cooperation with the other elements, as described. For example, the speed test can be executed by the customer premises equipment (CPE) device in conjunction with the speed test server.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server implementing one or more of the blocks/sub-blocks 995, 999 and the like, and that such program may be embodied on a tangible computer readable recordable storage medium. A program can also be run on a processor 306 of CPE 106, 997 (or processor of SoC 1991). As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement blocks/sub-blocks 995, 997, 999). The method steps can then be carried out using the distinct software modules of the system, as described above, executing on one or more hardware processors (e.g., one or more hardware processors of server(s) 999, 995 and one or more hardware processors of STB or other CPE 106, 997 (or processor of SoC 1991)). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
obtaining, at a customer premises equipment (CPE) device in a broadband network, an invocation of a speed test by an auto-configuration server (ACS), said invocation including an activity detection threshold and an activity detection period based on a TR-181 data model object, said TR-181 data model object updated to include said activity detection threshold and said activity detection period;
responsive to said invocation, determining average interface utilization for said customer premises equipment (CPE) device over said activity detection period;
responsive to said determining indicating that said average interface utilization for said customer premises equipment (CPE) device over said activity detection period does not exceed said activity detection threshold, said customer premises equipment (CPE) device cooperating with a speed test server to execute a speed test on said customer premises equipment (CPE) device using a speed test tool; and granting, during said speed test, priority to traffic originating from and destined for a given subscriber interface of said customer premises equipment (CPE) device over traffic for said speed test, wherein:

said activity detection threshold and said activity detection period are obtained as said TR-181 data model object and parameter custom extensions, wherein a TR-181 data model is extended to include UDP jitter; and in said executing step, said speed test comprises an iPerf speed test.

2. The method of claim 1, wherein said speed test tool is configured to return maximum bandwidth between said customer premises equipment (CPE) device and said speed test server.

3. The method of claim 1, wherein, in said executing step, said iPerf speed test comprises an iPerf3 speed test.

4. The method of claim 3, wherein, in said executing step, said iPerf3 speed test comprises a forward speed test.

5. The method of claim 3, wherein, in said executing step, said iPerf3 speed test comprises a reverse speed test.

6. The method of claim 3, further comprising:

obtaining, at said customer premises equipment (CPE) device in said broadband network, a second invocation of a speed test by said auto-configuration server (ACS), said second invocation including a second activity detection threshold, a second activity detection period, and an activity detection retry wait period;

responsive to said second invocation, determining average interface utilization for said customer premises equipment (CPE) device over said second activity detection period;

responsive to said determining indicating that said average interface utilization for said customer premises equipment (CPE) device over said activity detection period does exceed said second activity detection threshold, waiting for said activity detection retry wait period and then re-determining said average interface utilization for said customer premises equipment (CPE) device.

7. The method of claim 6, wherein said second activity detection threshold, said second activity detection period, and said activity detection retry wait period are obtained as the TR-181 data model object and parameter custom extensions.

8. The method of claim 6, wherein said obtaining of said second invocation further includes an activity detection retry count, further comprising, responsive to said re-determining indicating that said average interface utilization for said customer premises equipment (CPE) device over said activity detection period still exceeds said second activity detection threshold:

determining whether said activity detection retry count has been reached; and responsive to said determining indicating that said activity detection retry count has not been reached, again re-determining said average interface utilization for said customer premises equipment (CPE) device.

9. The method of claim 8, wherein said second activity detection threshold, said second activity detection period, said activity detection retry wait period, and said activity detection retry count are obtained as the TR-181 data model object and parameter custom extensions.

10. The method of claim 3, wherein said average interface utilization is determined using bytes sent and bytes received counters.

11. The method of claim 3, further comprising:

said average interface utilization for said customer premises equipment (CPE) device increasing above said activity detection threshold over a subsequent activity detection period, during execution of said speed test.

12. The method of claim 3, further comprising sending results of said speed test from said customer premises equipment (CPE) device to said auto-configuration server (ACS).

13. The method of claim 12, wherein:

said invocation of said speed test is obtained at said customer premises equipment (CPE) device as a first remote procedure call (RPC), responsive to said auto-configuration server (ACS) obtaining a first application programming interface (API) call from an IT service; and said results of said speed test are sent from said customer premises equipment (CPE) device to said auto-configuration server (ACS) via retrieval by said auto-configuration server (ACS) as a second remote procedure call (RPC), in turn for retrieval by said IT service from said auto-configuration server (ACS) via a second application programming interface (API) call.

14. The method of claim 3, wherein said customer premises equipment (CPE) device comprises a bridge-only device which does not perform network address translation (NAT) or port address translation (PAT), further comprising said customer premises equipment (CPE) device obtaining an additional internet protocol lease prior to executing said speed test.

15. The method of claim 3, further comprising sending results of said speed test from said speed test server to said auto-configuration server (ACS).

16. The method of claim 15, wherein:

said invocation of said speed test is obtained at said customer premises equipment (CPE) device as a first remote procedure call (RPC), responsive to said auto-configuration server (ACS) obtaining a first application programming interface (API) call from an IT service; and said results of said speed test are sent from said speed test server to said auto-configuration server (ACS), in turn for retrieval by said IT service from said auto-configuration server (ACS) via a second application programming interface (API) call.

17. The method of claim 3, wherein, in said executing step, said iPerf3 speed test returns a diagnostic state code to said auto-configuration server (ACS), and in turn return the diagnostic state code to an IT service via an application programming interface (API) call.

18. A customer premises equipment (CPE) device comprising:

a memory;

at least one processor coupled to said memory;

at least one wide area network (WAN) port; and a non-transitory persistent storage medium that contains instructions which, when loaded into said memory, configure said at least one processor to:

obtain an invocation of a speed test by an auto-configuration server (ACS), said invocation including an activity detection threshold and an activity detection period based on a TR-181 data model object, said TR-181 data model object updated to include said activity detection threshold and said activity detection period;

responsive to said invocation, determine average interface utilization for said customer premises equipment (CPE) device over said activity detection period;

responsive to said determining indicating that said average interface utilization for said customer premises equipment (CPE) device over said activity detection period does not exceed said activity detection threshold, cooperate with a speed test server to execute a speed test on said customer premises equipment (CPE) device using a speed test tool, via said wide area network (WAN) port; and grant, during said speed test, priority to traffic originating from and destined for a given subscriber interface of said customer premises equipment (CPE) device over traffic for said speed test, wherein:

said at least one processor obtains said activity detection threshold and said activity detection period as said TR-181 data model object and parameter custom extensions, wherein a TR-181 data model is extended to include UDP jitter; and in said executing step, said speed test comprises an iPerf speed test.

19. The customer premises equipment (CPE) device of claim 18, wherein said iPerf speed test comprises an iPerf3 speed test.

20. The customer premises equipment (CPE) device of claim 18, wherein said instructions, when loaded into said memory, further configure said at least one processor to: obtain a second invocation of a speed test by said auto-configuration server (ACS), said second invocation including a second activity detection threshold, a second activity detection period, and an activity detection retry wait period; responsive to said second invocation, determine average interface utilization for said customer premises equipment (CPE) device over said second activity detection period; responsive to said determining indicating that said average interface utilization for said customer premises equipment (CPE) device over said activity detection period does exceed said second activity detection threshold, wait for said activity detection retry wait period and then re-determine said average interface utilization for said customer premises equipment (CPE) device.

21. The customer premises equipment (CPE) device of claim 18, wherein said device comprises a Bidirectional Optical Sub-Assembly (BOSA) on-board optical transceiver.

22. A system comprising:
a customer premises equipment (CPE) device; and
a speed test server coupled to said customer premises equipment (CPE) device;
wherein said customer premises equipment (CPE) device is configured to:
obtain an invocation of a speed test, said invocation including an activity detection threshold and an activity detection period based on a TR-181 data model object, said TR-181 data model object updated to include said activity detection threshold and said activity detection period;

responsive to said invocation, determine average interface utilization for said customer premises equipment (CPE) device over said activity detection period; and responsive to said determining indicating that said average interface utilization for said customer premises equipment (CPE) device over said activity detection period does not exceed said activity detection threshold, execute a speed test on said customer premises equipment (CPE) device, in conjunction with said speed test server, using a speed test tool; and grant, during said speed test, priority to traffic originating from and destined for a given subscriber interface of said customer premises equipment (CPE) device over traffic for said speed test, wherein:

said activity detection threshold and said activity detection period are obtained as said TR-181 data model object and parameter custom extensions, wherein a TR-181 data model is extended to include UDP jitter; and in said executing step, said speed test comprises an iPerf speed test.

23. The system of claim 22, wherein said iPerf speed test comprises an iPerf3 speed test.

24. The system of claim 23, wherein said customer premises equipment (CPE) device is further configured to:
obtain a second invocation of a speed test, said second invocation including a second activity detection threshold, a second activity detection period, and an activity detection retry wait period;
responsive to said second invocation, determine average interface utilization for said customer premises equipment (CPE) device over said second activity detection period;
responsive to said determining indicating that said average interface utilization for said customer premises equipment (CPE) device over said activity detection period does exceed said second activity detection threshold, wait for said activity detection retry wait period and then re-determine said average interface utilization for said customer premises equipment (CPE) device.

25. The system of claim 22, further comprising an auto-configuration server (ACS) coupled to said customer premises equipment (CPE) device, wherein said invocation of said speed test is obtained from said auto-configuration server (ACS).

26. The system of claim 25, wherein said speed test server is configured to send results of said speed test to said auto-configuration server (ACS).

27. The system of claim 25, wherein said customer premises equipment (CPE) device is configured to send results of said speed test to said auto-configuration server (ACS).

* * * * *